(12) United States Patent     (10) Patent No.: US 12,334,830 B2
Prasai et al.     (45) Date of Patent: Jun. 17, 2025

(54) MULTI-PHASE CASCADED BRIDGE FOR DC/DC, AC/DC, AND DC/AC APPLICATIONS

(71) Applicant: Apple Inc., Cupertino, CA (US)

(72) Inventors: Anish Prasai, Santa Clara, CA (US); Ashish K Sahoo, San Jose, CA (US); Brandon Pierquet, San Francisco, CA (US); Jie Lu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 18/326,557

(22) Filed: May 31, 2023

(65)         Prior Publication Data

US 2024/0405686 A1    Dec. 5, 2024

(51) Int. Cl.
     *H02M 3/335*       (2006.01)
     *H02M 7/219*       (2006.01)
     *H02M 7/5387*     (2007.01)
     *H02P 27/06*       (2006.01)

(52) U.S. Cl.
     CPC ... *H02M 3/33571* (2021.05); *H02M 3/33576* (2013.01); *H02M 7/219* (2013.01); *H02M 7/5387* (2013.01); *H02P 27/06* (2013.01)

(58) Field of Classification Search
     CPC ............. H02P 2201/03; H02P 2201/05; H02P 2201/07; H02P 2201/09; H02P 2207/05; H02P 2207/076; H02P 27/06; H02P 27/08; H02P 29/024; H02P 29/028; H02P 27/04; H02P 1/24; H02P 1/26; H02P 3/22; H02P 11/04; H02P 11/06; B60L 2210/10; B60L 2210/30; B60L 2210/40; B60L 53/53; B60L 53/122; B60L 53/22; H02M 3/33571; H02M 7/483; H02M 1/0074; H02M 1/0077; H02M 3/07; H02M 3/335; H02M 3/33546; H02M 3/33569; H02M 3/33573; H02M 7/5387; H02M 1/0085; H02M 1/0003; H02M 1/4233; H02M 7/219
See application file for complete search history.

(56)         References Cited

U.S. PATENT DOCUMENTS

2017/0063251 A1*    3/2017   Ye ..................... H02M 3/33576

\* cited by examiner

*Primary Examiner* — Antony M Paul
(74) *Attorney, Agent, or Firm* — FLETCHER YODER PC

(57)         ABSTRACT

An isolated switching converter can include an inverting bridge, a transformer, a rectifying bridge, and control circuitry. The inverting bridge can receive an input voltage and deliver an output voltage to the transformer primary windings. The inverting bridge can include a plurality of half bridges cascaded across the input voltage. Each half bridge can include an input capacitor; upper and lower switches coupled across the input capacitor and connected at a switch node; and a DC blocking capacitor coupled between the switch node and a primary winding terminal. The rectifying bridge can have an input coupled to the secondary windings of the transformer and can deliver an output voltage of the isolated switching converter. The control circuitry can monitor inverter feedback signal(s) and generate phase staggered inverter drive signal(s). The control circuitry can also monitor rectifier feedback signal(s) and generate rectifier drive signals that operate the rectifying bridge.

20 Claims, 16 Drawing Sheets

MULTI-PHASE CASCADED BRIDGE FOR DC/DC, AC/DC, AND DC/AC APPLICATIONS

BACKGROUND

For isolated DC-DC and AC-DC converters and inverters, increasing power handling, current levels, operating voltages, and the like can pose challenges to the realization of compact and cost-effective systems. Increasing voltages also require use of semiconductor switches having higher voltage ratings, which may be more costly and may exhibit slower performance than switches with lower voltage ratings. This can further increase system cost and size due to larger magnetic components and/or passive devices used to accommodate lower switching frequencies.

SUMMARY

Thus, for many applications it would be desirable to provide switching converter designs that can accommodate higher power, voltage, and current levels while allowing for higher frequency operation. Multi-phase implementations can be used to increase power density as power levels rise. Multi-level topologies can be used to convert higher voltages with switches rated at a fraction of the maximum system voltage. Disclosed herein are various multi-phase converter implementations using multiple half bridges stacked on a single leg to generate multi-phase voltages.

An isolated switching converter can include an inverting bridge, a transformer, a rectifying bridge, and control circuitry. The inverting bridge can have an input that receives an input voltage and an output that delivers a voltage to a plurality of primary windings of the transformer. The inverting bridge can include a plurality of half bridges cascaded across the input voltage. Each half bridge can include an input capacitor; upper and lower switches coupled across the input capacitor and connected at a switch node; and a DC blocking capacitor coupled between the switch node and a primary winding terminal of the transformer. The rectifying bridge can have an input coupled to a plurality of secondary windings of the transformer and an output that delivers a voltage to an output of the isolated switching converter. The rectifying bridge can include one or more rectifier switches. The control circuitry can monitor one or more inverter feedback signals and can generate in response thereto inverter drive signals that operate the upper and lower switches of the plurality of half bridges in a phase staggered manner. The control circuitry can also monitor one or more rectifier feedback signals and can generate in response thereto rectifier drive signals that operate one or more switches of the rectifying bridge.

The input voltage can be a DC voltage. The plurality of half bridges can include three half bridges. The primary windings and/or the secondary windings of the transformer can be connected in a delta or wye configuration. The primary windings or the secondary windings of the transformer can be connected in an open configuration. The rectifying bridge can be a multi-phase half-bridge rectifying bridge or a current multiplying rectifying bridge.

The rectifying bridge can be a multiphase cascaded bridge comprising a plurality of half bridges cascaded across the output voltage. Each half bridge can include a DC blocking capacitor coupled between a secondary winding terminal of the transformer and a switch node of the half bridge; and upper and lower switches connected at the switch node and coupled across an output capacitor.

The inverting bridge can include a plurality of inverting bridges connected to respective AC input voltages. The primary windings can be connected in an open configuration, and the secondary windings can be connected in a delta configuration. The inverting bridge can include first and second half bridges connected in a split phase configuration to the secondary winding terminals. The rectifying bridge can be a split phase cascaded bridge.

A motor drive can include an inverting bridge and control circuitry. The inverting bridge can have an input that receives an input voltage and an output that delivers a multi-phase voltage to a plurality of motor windings. The inverting bridge can include a plurality of half bridges cascaded across the input voltage. Each half bridge can include an input capacitor; upper and lower switches coupled across the input capacitor and connected at a switch node; and a DC blocking capacitor coupled between the switch node and a primary winding terminal of the transformer. The control circuitry can monitor one or more inverter feedback signals and can generate in response thereto inverter drive signals that operate the upper and lower switches of the plurality of half bridges in a phase staggered manner.

The plurality of half bridges can include three half bridges. The control circuitry can short circuit the plurality of motor windings by alternately applying first and second switching configurations that short circuit the motor windings and maintain a voltage balance of the input capacitors.

An isolated switching converter can include an inverting bridge, one or more transformers, a rectifying bridge, and control circuitry. The inverting bridge can have an input that receives an input voltage and an output including a plurality of bridge attachment points and a plurality of switch nodes that can be selectively connected to a plurality of transformer primary windings. The inverting bridge can further have a plurality of half bridges cascaded across the input voltage. Each half bridge can include an input capacitor coupled between two of the plurality of bridge attachment points corresponding to the half bridge; upper and lower switches coupled across the input capacitor and connected at a switch node of the plurality of switch nodes corresponding to the half bridge; and a DC blocking capacitor coupled between the switch node corresponding to the half bridge and a primary winding terminal of the one or more transformers. The rectifying bridge can have an input coupled to one or more secondary windings of the one or more transformers and an output that delivers an output voltage to an output of the isolated switching converter. The rectifying bridge can include one or more rectifier switches. The control circuitry can monitor one or more inverter feedback signals and generate in response thereto inverter drive signals that operate the upper and lower switches of the plurality of half bridges in a phase staggered manner. The control circuitry can also monitor one or more rectifier feedback signals and generate in response thereto rectifier drive signals that operate one or more switches of the rectifying bridge.

The one or more transformers can include a plurality of single-phase transformers. The one or more transformers can include a multi-phase transformer. The one or more transformers can include a split-phase transformer. The rectifying bridge can be a multi-phase half-bridge rectifying bridge or a current multiplying rectifying bridge. The rectifying bridge can be a multiphase cascaded bridge that includes a plurality of half bridges cascaded across the output voltage. Each half bridge can include a DC blocking capacitor coupled between a secondary winding terminal of the transformer and a switch node of the half bridge; and upper and lower switches connected at the switch node and coupled across an output capacitor.

DETAILED DESCRIPTION

Figure 1A:
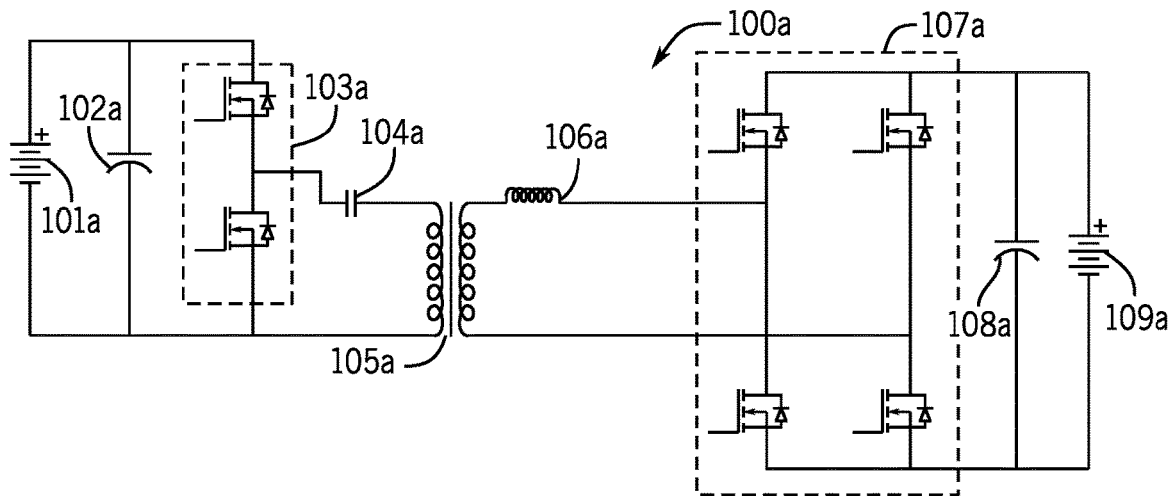
FIGS. 1A-1E illustrate various half-bridge power conversion systems.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIGS. 1A-1E illustrate various half-bridge power conversion systems. More specifically, FIG. 1A schematically depicts a DC-DC converter 100a that uses a half bridge converter 103a to generate an AC voltage from a DC input voltage 101a. In the illustrated example, input voltage 101a is represented as a battery, although other DC voltage sources could also be used. DC-DC converter 100a also includes an input capacitor 102a. The AC voltage generated by half bridge converter 103a can be applied to transformer 105a, which can step up or step down the voltage as appropriate and also provide galvanic isolation between the input and output. Half bridge converter 103a can be coupled to transformer 105a by a DC blocking capacitor 104a. Inductor/inductance 106a may be either a discrete component provided for current shaping or can be leakage inductance of transformer 105a or a parasitic inductance of the physical circuit structure. In any case, the secondary voltage of transformer 105a can be provided to a rectifier bridge 107a. In the illustrated example, rectifier bridge 107a is a full bridge rectifier, although other rectifier structures could also be provided. Rectifier bridge 107a converts the AC secondary voltage of transformer 105a to a DC voltage that can be supplied to an output load 109a. In the illustrated example, output load 109a is also a battery, meaning that DC-DC converter 100a is a battery charger, although any DC output load can be powered by the illustrated system. The output voltage bus may be supported by an output filter capacitor 108a.

Figure 1B:
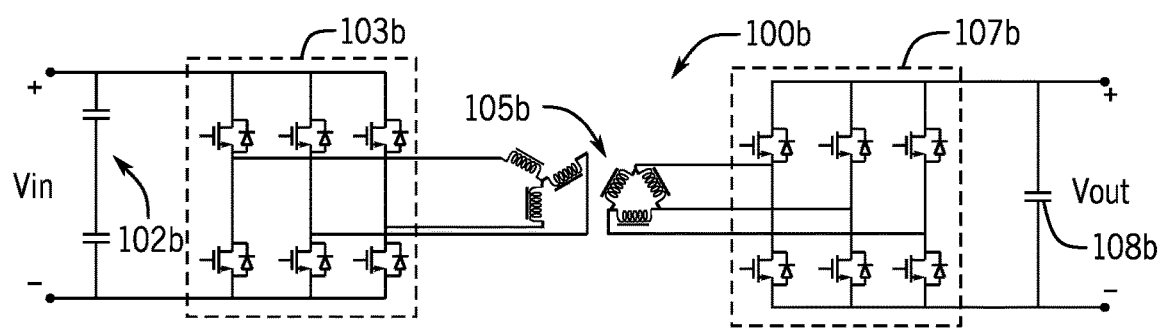

FIG. 1B schematically depicts a two-level, three-phase DC-DC converter 100b. Converter 100b receives a DC input voltage Vin across stacked input capacitors 102b. DC input voltage Vin is provided to a switching bridge 103b that includes three half bridges that can be operated 120 degrees out of phase with respect to each other to generate a three-phase voltage that can be applied to the primary of transformer 105b. As illustrated, the primary windings of transformer 105b are connected in a wye configuration, although a delta configuration could also be used. The secondary windings of transformer 105b are connected in a delta configuration, although a wye configuration could also be used. The three-phase AC voltage appearing on the secondary windings of transformer 105b can be provided to a rectifier 107b. In the illustrated example, rectifier 107b employs three half bridges that can be operated 120 degrees out of phase with respect to each other to produce a DC output voltage Vout that can be provided to a DC load (not shown). The output DC bus can be supported by an output filter capacitor 108b.

Figure 1C:
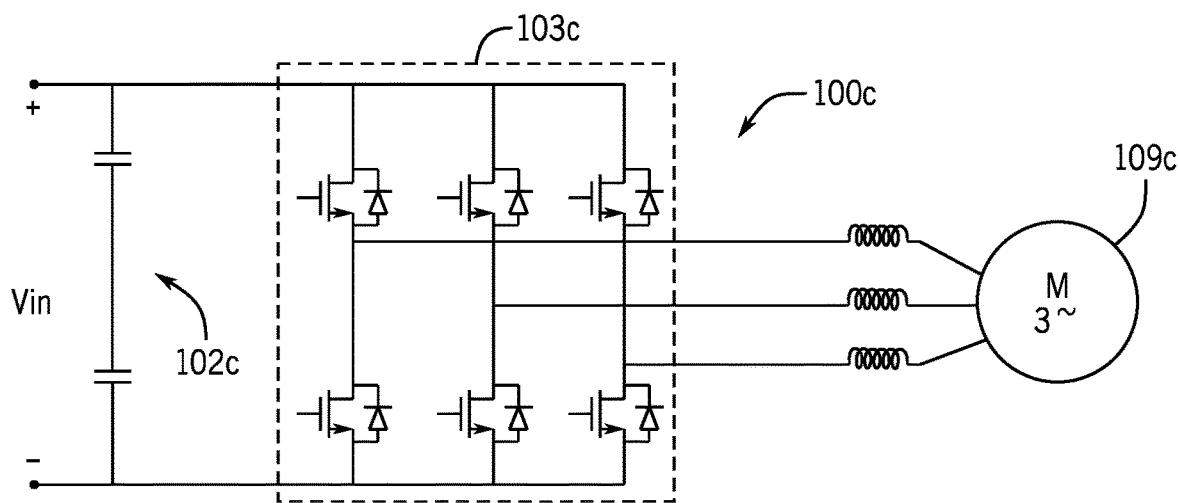

FIG. 1C schematically depicts a DC to three-phase motor drive 100c. The three-phase motor drive receives an input voltage Vin, which is provided across input capacitors 102c to an inverter bridge 103c including three half bridges that can be operated 120 degrees out of phase with respect to each other to produce an AC voltage that can be supplied to electric motor 109c, which can be a three-phase electric motor.

Figure 1D:
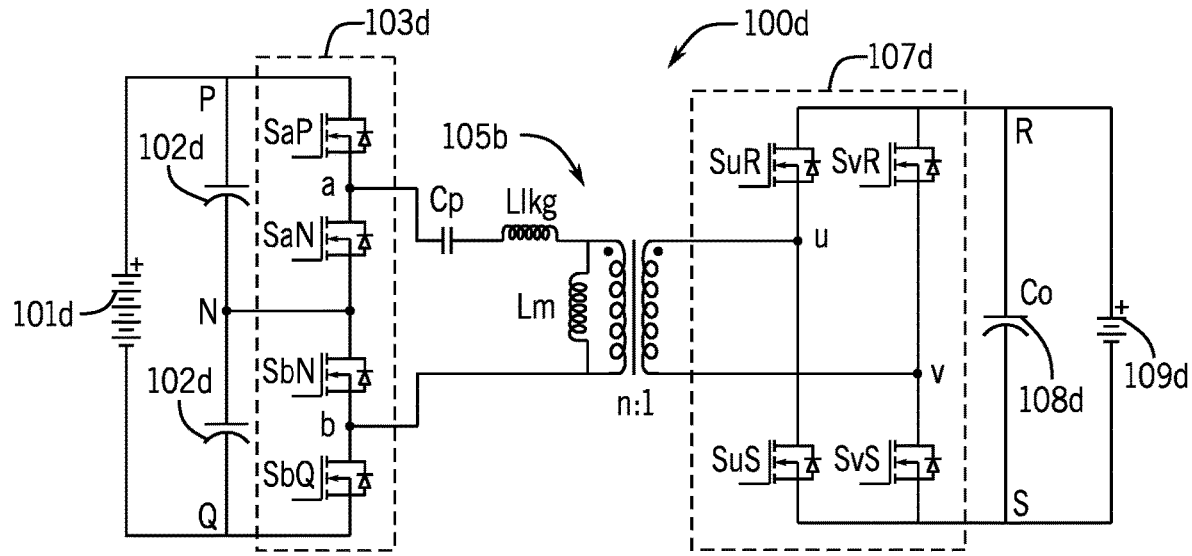

FIG. 1D schematically depicts a stacked half bridge DC-DC converter 100d. In the illustrated example, stacked half bridge converter 100d is a DC-DC converter employed as a battery charger analogous to DC-DC converter 100a described above with reference to FIG. 1A. Thus, an input DC voltage 101d (illustrated as being from a battery, but which could be from any DC source) is provided via stacked input capacitors 102d to a stacked half bridge converter 103d. Stacked half bridge converter 103d includes an upper half bridge made up of switches SaP and SaN that are coupled together at a switch node a and a lower half bridge made up of switches SbN and SbQ that are coupled together at a switch node b. Switches SaP, SaN, SbQ, and SbN may be operated to convert the input DC voltage into an AC voltage appearing between switch nodes a and b. Thus stacked half bridge converter 103d can be considered a stacked half bridge inverter.

The AC voltage from stacked half bridge converter 103d can be applied to a transformer 105d via a coupling/DC blocking capacitor Cp. Also depicted in FIG. 1D are the leakage inductance Llkg and magnetizing inductance Lm of transformer 105d, which are not physical components, but rather properties of the physical construction of transformer 105d. Transformer 105d may have a turns ratio of n:1, allowing the primary voltage from stacked half bridge converter 103d to be stepped up or stepped down as appropriate for the load. An AC voltage appearing at the secondary of transformer 105d, having a magnitude determined by the turns ratio of transformer 105d, can be applied to the input of full bridge rectifier 107d. Full bridge rectifier 107d can convert the secondary AC voltage into a DC voltage that can be delivered to a load 109d. In the illustrated example, load 109d is a battery, and thus converter 100d is a battery charger, although other types of DC loads could be powered by such a circuit. As in other examples discussed above, the output DC bus can be supported by an output filter capacitor 108d.

Figure 1E:
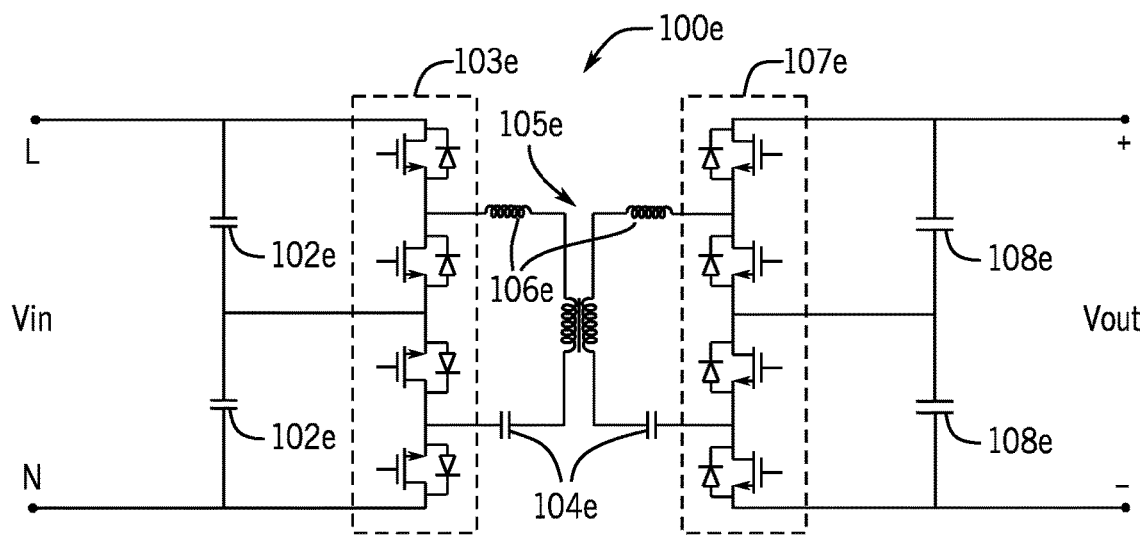

FIG. 1E schematically depicts a single-phase stacked half bridge AC-DC converter 100c. An AC input voltage Vin may be applied across stacked input capacitors 102e and provided to a stacked half bridge 103e, which can include upper and lower half bridges each having upper and lower switches as described above with respect to FIG. 1D, but which are unlabeled in FIG. 1E for sake of brevity. Stacked half bridge 103e can be operated as an inverter to produce an AC voltage at the switch nodes of the respective half bridges that can be provided to transformer 105c. Stacked half bridge 103e can be considered an inverter even though it has an AC input in that the voltage and/or frequency of the output voltage of stacked half bridge 103e can be different from the voltage and/or frequency input into stacked half bridge converter 103e. The AC output of stacked half bridge converter 103e can be provided to transformer 150e via DC blocking capacitor 104c. Also depicted at the coupling of stacked half bridge converter 103e to transformer 105e is inductance 106c, which can be a discrete inductor, a parasitic inductance associated with the circuit construction, and/or a leakage inductance of transformer 105c.

Transformer 105e can produce at its secondary an AC voltage that is proportional to the AC voltage supplied to the primary by the turns ratio of the transformer. More specifically, the circuit includes dual active bridges, where the inverting and rectifying bridges control the voltages across the primary and secondary windings of the transformer. The difference in the two applied voltages (when scaled by turn ratio and reflected onto the same side) across the leakage inductance can thus be used to control the amplitude and direction of power. In any case, the secondary voltage can be provided to a stacked half bridge converter 107e, which can also be coupled to the transformer secondary winding by a DC blocking capacitor 104c and an optional inductance 106c, which can be a discrete inductor, a parasitic inductance associated with the circuit construction, and/or a leakage inductance of transformer 105e. Stacked half bridge converter 107e can include upper and lower half bridges, each having upper and lower switches as described above. The switches can be operated to convert the AC voltage appearing at the switch nodes of stacked half bridge converter 107e to a DC output voltage that can be supplied to a DC load (not shown). Similarly, to the above-described examples, the output DC bus may be supported by stacked DC output filter capacitors, in this case implemented as stacked DC output filter capacitors 108c.

Various permutations of the above-described circuits may be implemented as desired. For example, switching patterns may be adapted to provide AC-DC, DC-AC, or DC-DC operation, etc. Transformer turns ratios may be selected to provide step-up or step-down operation as required for a given application. Switches may be implemented using any suitable switching device type, such as transistors (including bipolar or field effect transistors), silicon-controlled rectifiers (SCRs), thyristors, etc. Such switching devices can be implemented using any suitable semiconductor material, such as silicon (Si), silicon carbide (SiC), gallium nitride (GaN), etc. Control strategies and switching sequences can be controlled and adapted to provide suitable operation in various operating regimes. Similar permutations can also be applied to the circuits described in greater detail below.

Figure 2A:
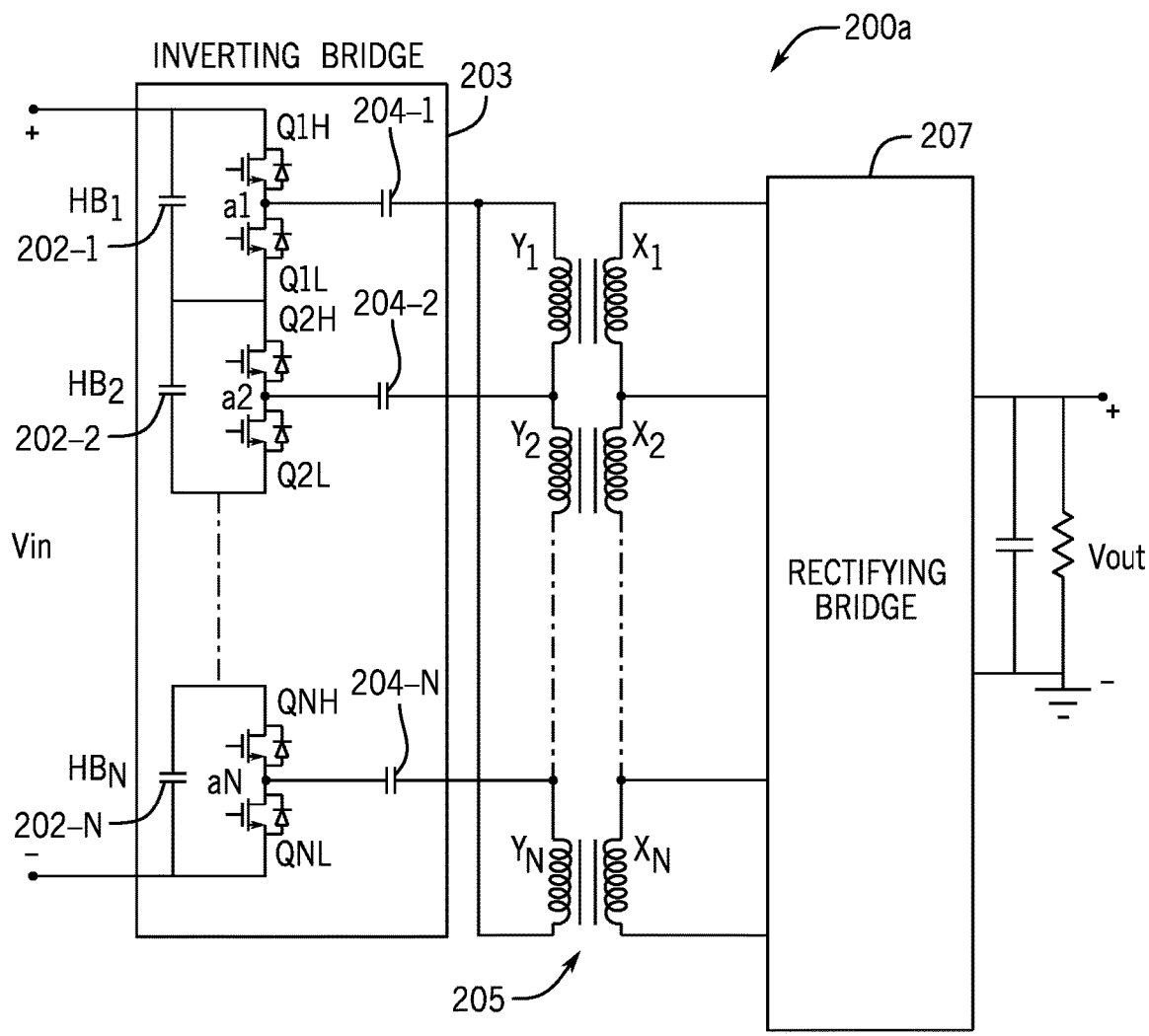
FIG. 2A illustrates a multi-phase cascaded bridge DC-DC converter having N phases.
Figure 2A:
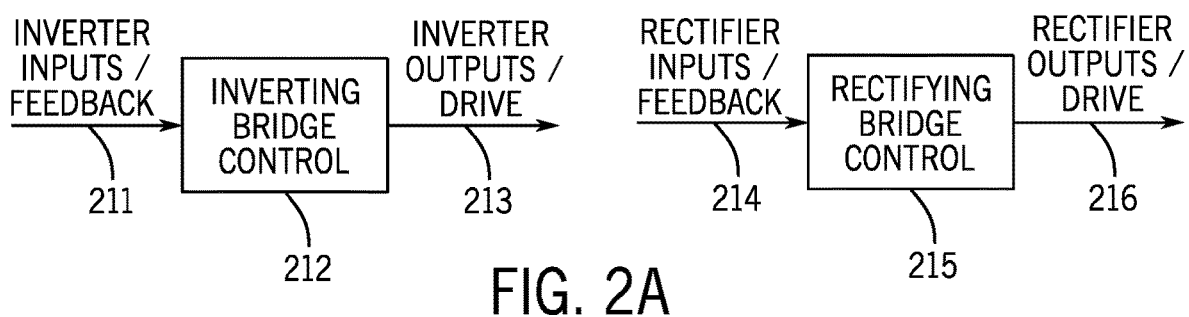

FIG. 2A schematically depicts a multi-phase cascaded bridge DC-DC converter 200a having N phases. Multi-phase cascaded bridge DC-DC converter 200a receives an input voltage Vin that can be provided to inverting bridge 203. Inverting bridge 203 can be made up of a plurality of half bridges HB1, HB2, . . . , HBN. Each half bridge can include an input capacitor 202-1, 202-2, . . . 202-N, which can be stacked across the input voltage. This can advantageously allow each input capacitor to have a voltage rating approximately Vin/N rather than having to be rated for the entire input voltage. Each half bridge can also include respective upper and lower switches Q1H, Q1L, Q2H, Q2L, . . . , QNH, QNL, which can be coupled at respective switch nodes a1, a2, . . . , aN. These switch nodes a1, a2, . . . , aN can be coupled via DC blocking capacitors 204-1, 204-2, . . . , 204-N to primary windings Y1, Y2, YN of a transformer 205.

In the illustrated embodiment, the primary windings are connected in a "delta" configuration in that a second terminal each winding is connected to a first terminal of the next winding, e.g., a second terminal of winding Y1 is connected to a first winding of winding Y2 and so on with a second terminal of winding YN being coupled back to the first terminal of winding Y1. In a three-phase system, implemented using three cascaded half bridges, this would result in a conventional three-phase delta configuration, although more than three phases could be used resulting in a configuration that is referred to herein as a delta even though it would have more than three legs or sides. Alternatively, primary windings Y1, Y2, . . . , YN could be connected in a "wye" configuration with a first terminal of each winding connected to a respective switch node via a respective DC blocking capacitor and the second terminal of all windings being coupled together. In a three-phase system, implemented using three cascaded half bridges, this would result in a conventional three-phase wye configuration, although more than three phases could be used resulting in a configuration that is referred to herein as a wye even though it would have more than three legs or branches.

Transformer 205 also includes a plurality of secondary windings X1, X2, . . . , XN, which can be magnetically coupled to corresponding primary windings. These secondary windings can be coupled to a rectifying bridge 207, discussed in greater detail below with respect to FIGS. 2C-2E. The secondary windings can be connected in a delta or wye configuration as was described above with respect to the primary windings. Alternatively, in some embodiments, each secondary winding could be treated separately as an individual single-phase winding. In any case, rectifying bridge 207 can convert the secondary voltage(s) appearing on the secondary windings of transformer 205 into a DC output voltage Vout. DC output voltage Vout can be provided to an output load (represented by the unlabeled resistor), and the output bus can be supported by an output filter capacitor (also unlabeled in FIG. 2A).

Multi-phase cascaded half bridge DC-DC converter 200a can also include control circuitry that monitors one or more circuit parameters, such as input or output voltage or current, and operates the respective switching devices to produce a desired input or output voltage or current. For example, multi-phase cascaded half bridge DC-DC converter 200a can include inverting bridge controller 212, which can monitor inverter control input/feedback signals 211 and implement one or more control algorithms or loops to produce inverter drive output signals 213, which can be provided to the switching devices Q1H, Q1L, Q2H, Q2L, . . . , QNH, QNL to generate the desired output voltage from inverting bridge 203. Similarly, multi-phase cascaded half bridge DC-DC converter 200a can include rectifying bridge controller 215, which can monitor rectifier control input/feedback signals 214 and implement one or more control algorithms or loops to produce rectifier drive output signals 216, which can be provided to the switching devices of rectifying bridge 207 (not shown in FIG. 2A, but discussed in greater detail below) to generate the desired output voltage Vout. Controllers 212 and 215 can be implemented using any suitable combination of analog, digital, or programmable circuitry using discrete and/or integrated components. In some embodiments, controllers 212 and/or 215 can be implemented using a programmed/programmable microcontroller, application specific integrated circuits (ASICs), field programmable gate arrays (FPGAs) or the like. Likewise, although FIG. 2A illustrates separate controllers for inverting bridge 203 and rectifying bridge 207, a common controller could be used for both. Alternatively, the functionality of controllers 212 and 215 could be distributed with separate controllers being implemented for each input and/or output phase, potentially under the direction of respective supervisory controllers for the inverting bridge 203 and rectifying bridge 207.

To summarize, a multi-phase cascaded half bridge DC-DC converter 200a can thus include an N-phase topology built off N half-bridges HB1, HB2, . . . , HBN cascaded together on a single leg of the input voltage. Controller 212 can implement phase-staggered control of each half bridge, where each half bridge is by 360/N degrees out of phase to generate N-phase waveforms when measured between any two switch nodes a1, a2, . . . , aN. Symmetrical control of the half bridges, combined with symmetrical loading per winding can lead to a natural balancing of the stacked capacitor equal to Vin/N voltage per half-bridge. However, any deviation in symmetry can be compensated via the controller circuitry to maintain capacitor balancing. Additionally, N capacitors 204-1, 204-2, . . . 204-N can be employed as described above to block DC voltages on each switch node, with each capacitor having a peak voltage rating approximately equal to Vin/N. Moreover, for isolated DC-DC applications, an N-phase transformer 205 can be realized in all permutations of wye or delta combinations to minimize voltage/current stress for a given application. The secondary rectifying bridge 207 can be implemented with any permutation of N-phase bridge topology, depending on application, with options including: the proposed three-phase bridge, current N-tuple, classical N-phase two-level bridge, N-single-phase bridges, etc., as described below with reference to FIGS. 2C-2E.

Figure 2B:
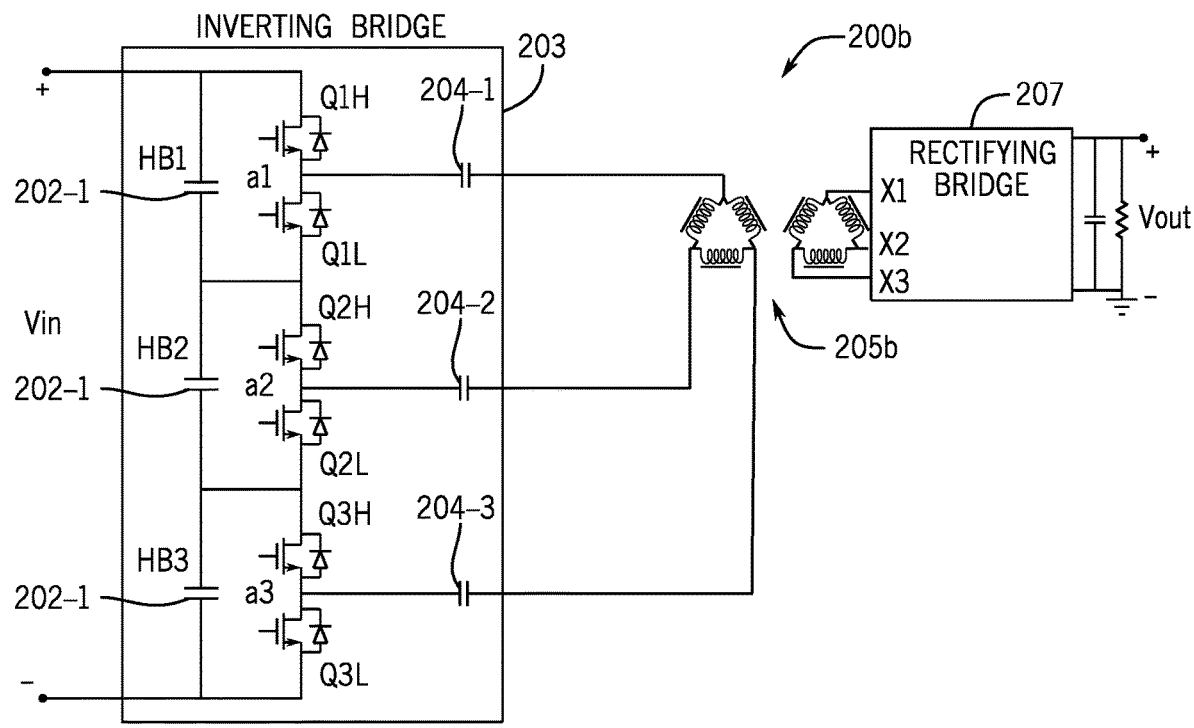
FIG. 2B illustrates a multi-phase cascaded bridge DC-DC converter having three phases.

FIG. 2B schematically depicts a three-phase cascaded bridge DC-DC converter 200b. Three-phase cascaded bridge DC-DC converter 200b receives an input voltage Vin that can be provided to inverting bridge 203. Inverting bridge 203 can be made up of a plurality of half bridges HB1, HB2, HB3. Each half bridge can include an input capacitor 202-1, 202-2, 202-3, which can be stacked across the input voltage. This can advantageously allow each input capacitor to have a voltage rating approximately Vin/3 rather than having to be rated for the entire input voltage. Each half bridge can also include respective upper and lower switches Q1H, Q1L, Q2H, Q2L, Q3H, Q3L, which can be coupled at respective switch nodes a1, a2, a3. These switch nodes a1, a2, a3 can be coupled via DC blocking capacitors 204-1, 204-2, 204-3 to primary windings of transformer 205, which can be coupled in a delta configuration.

Transformer 205b also includes a plurality of secondary windings, magnetically coupled to the primary windings, and coupled in a delta configuration having output terminals X1, X2, X3. These secondary windings can be coupled to a rectifying bridge 207, discussed in greater detail below with respect to FIGS. 2C-2E. Rectifying bridge 207 can convert the secondary voltage(s) appearing on the secondary windings of transformer 205b into a DC output voltage Vout. DC output voltage Vout can be provided to an output load (represented by the unlabeled resistor), and the output bus can be supported by an output filter capacitor (also unlabeled in FIG. 2B). Three-phase cascaded half bridge DC-DC converter 200b can also include control circuitry as described above with reference to FIG. 2A.

To summarize, a three-phase topology can be built using three half-bridges cascaded together on a single leg. Phase-staggered control of each half bridge by 120 degrees can be used to generate three-phase waveforms when measured between any two switch nodes a1, a2, a3. Three capacitors, 204-1, 204-2, 204-3 can be used to block DC voltages on each switch node, with average rating equal to Vin/3 for the top and bottom capacitors, and zero voltage for the middle capacitor. A three-phase transformer design with wye (not shown in FIG. 2B), delta (illustrated in FIG. 2B), or open (not shown in FIG. 2B) combinations to minimize voltage/ current stress per given application. Secondary rectifying bridge 207 can be implemented with any permutation of three-phase bridge topology, depending on application, with options including (but not limited to): a three-phase bridge, a current tripler, a classical 3-phase two-level bridge, three-single-phase bridges, etc. Examples of some rectifying bridges are discussed below with reference to FIGS. 2C-2E.

Figure 2C:
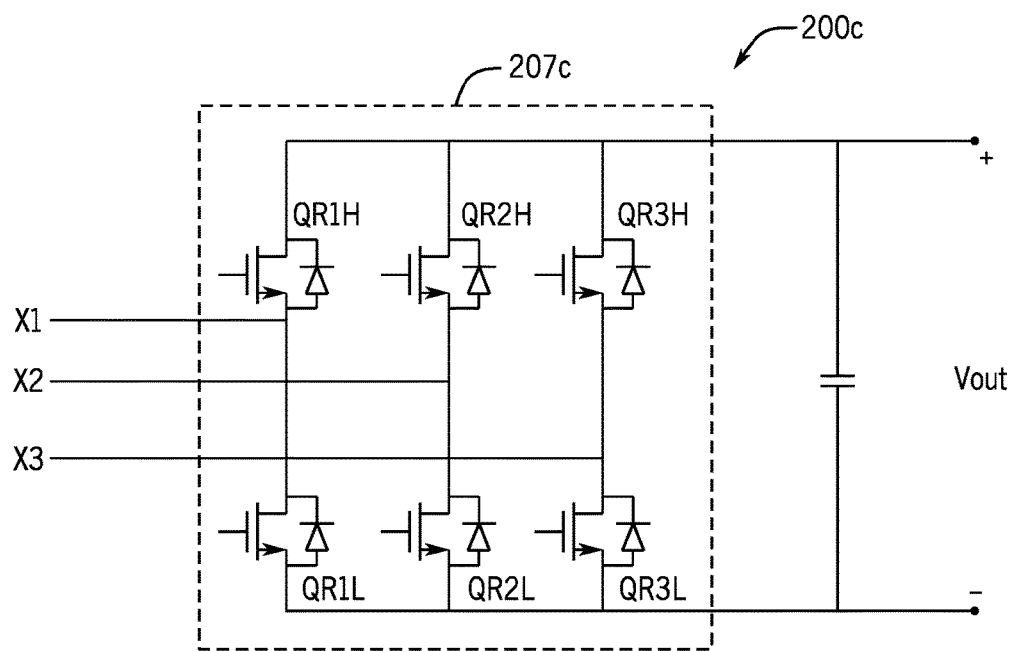
FIG. 2C illustrates a three-phase half bridge rectifying bridge that can be used in connection with the multi-phase cascaded bridge circuits described herein.

FIG. 2C schematically depicts output circuit 200c including a three-phase half bridge rectifying bridge 207c that can be used in connection with the multi-phase cascaded bridge circuits described above. Such a rectifying bridge could also be substituted into other circuits described below. Input terminals X1, X2, X3 of three-phase half bridge rectifying bridge 207c can be connected to respective terminals of transformer 205b as illustrated in FIG. 2B. This can couple switch nodes of the respective half bridges. The first half bridge can include an upper switch QR1H and a lower switch QR1L. The second half bridge can include an upper switch QR2H and a lower switch QR2L. The third half bridge can include an upper switch QR3H and a lower switch QR3L. The switches can be implemented using any suitable switching device type and/or any semiconductor technology as described above and can be controlled using control circuitry as described above to convert the three-phase secondary voltage appearing across transformer 205b into a DC output voltage Vout, that can be delivered to a load. Additionally, more or fewer phases could be provided to realize any multi-phase half bridge rectifying bridge.

Figure 2D:
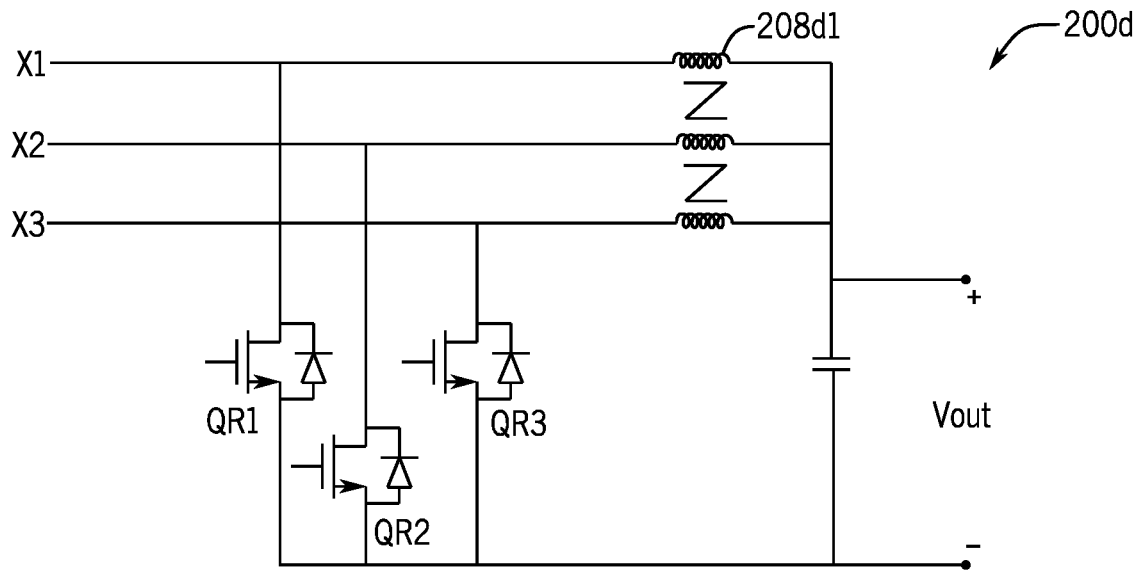
FIG. 2D illustrates a current tripler rectifying bridge that can be used in connection with the multi-phase cascaded bridge circuits described herein.

FIG. 2D schematically depicts output circuit 200d including a current tripler rectifying bridge that can be used in connection with the multi-phase cascaded bridge circuits described above. Such a rectifying bridge could also be substituted into other circuits described below. Input terminals X1, X2, X3 of current tripler rectifying bridge 200d can be connected to respective terminals of transformer 205b as illustrated in FIG. 2B. This can couple the high sides of rectifier switches QR1, QR2, and QR3 to the secondary voltage, with their low sides being coupled to the output ground/negative terminal. The switches can be implemented using any suitable switching device type and/or any semiconductor technology as described above and can be controlled using control circuitry as described above to convert the three-phase secondary voltage appearing across transformer 205b into a DC output voltage Vout, that can be delivered to a load via three phase inductor 208d1. More or fewer switching devices and inductor phases could be provided to provide different current multipliers to realize a current multiplying rectifying bridge of any desired multiple/number of phases.

Figure 2E:
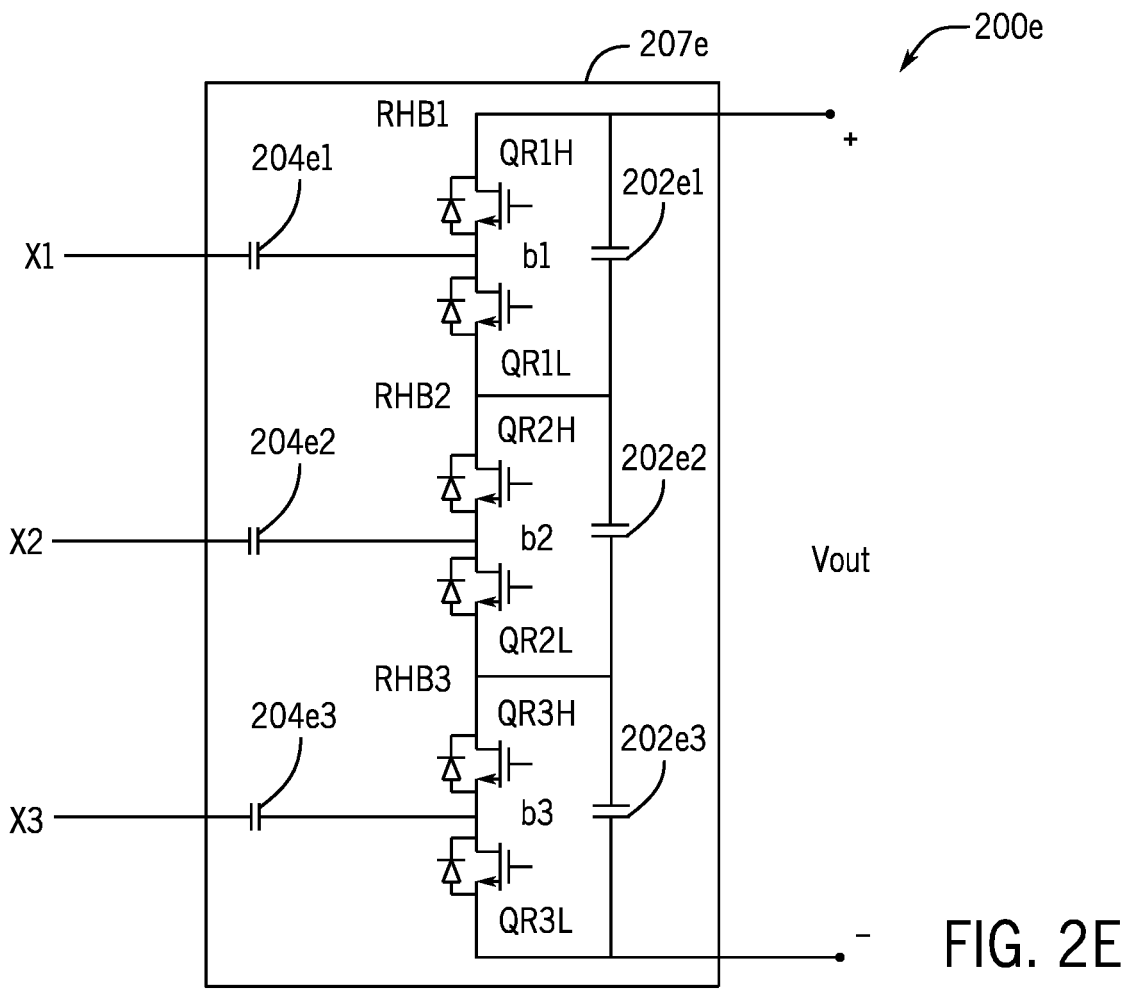
FIG. 2E illustrates a multi-phase cascaded bridge rectifying bridge that can be used in connection with the multi-phase cascaded bridge circuits described herein.

FIG. 2E schematically depicts an output circuit 200e including multi-(three-) phase cascaded bridge rectifying bridge 207e that can be used in connection with the multi-phase cascaded bridge circuits described herein. Input terminals X1, X2, X3 can be coupled to the output of transformer 205b as illustrated in FIG. 2B. This can allow the secondary voltage of transformer 205b to be coupled via DC blocking capacitors 204e1, 204e2, 204e3 to a cascade of rectifier half bridges RHB1, RHB2, RHB3. Each rectifier half bridge can also respectively include high side switches QR1H, QR2H, QR3H and low side switches QR1L, QR2L, QR3L coupled at respective switch nodes b1, b2, b3. These switches can be operated as a rectifier to convert the received secondary AC voltage into an output DC voltage, with the output bus being supported by cascaded capacitors 202e1, 202e2, 202e3.

Figure 3A:
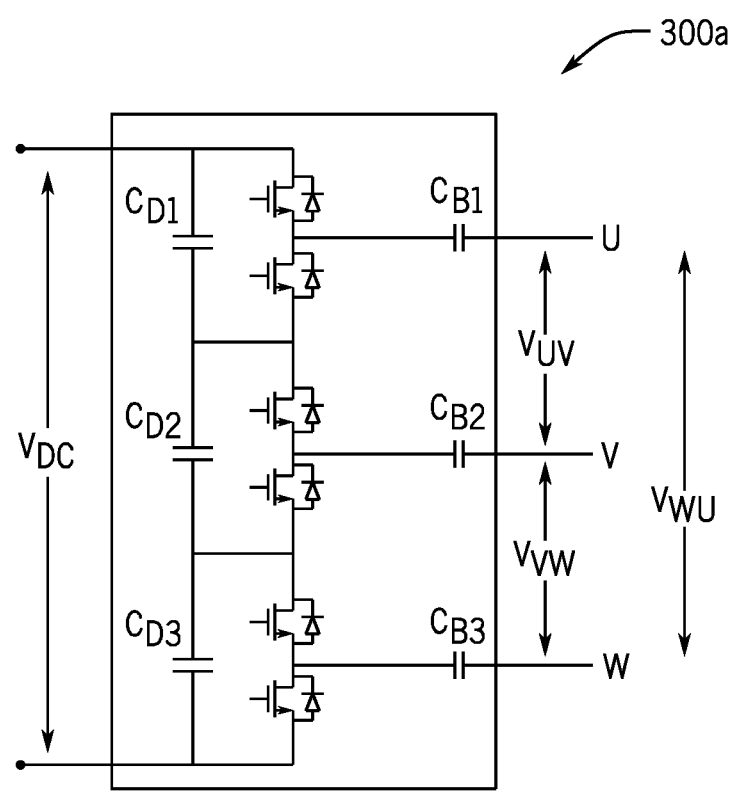
FIG. 3A illustrates drive patterns.
Figure 3B:
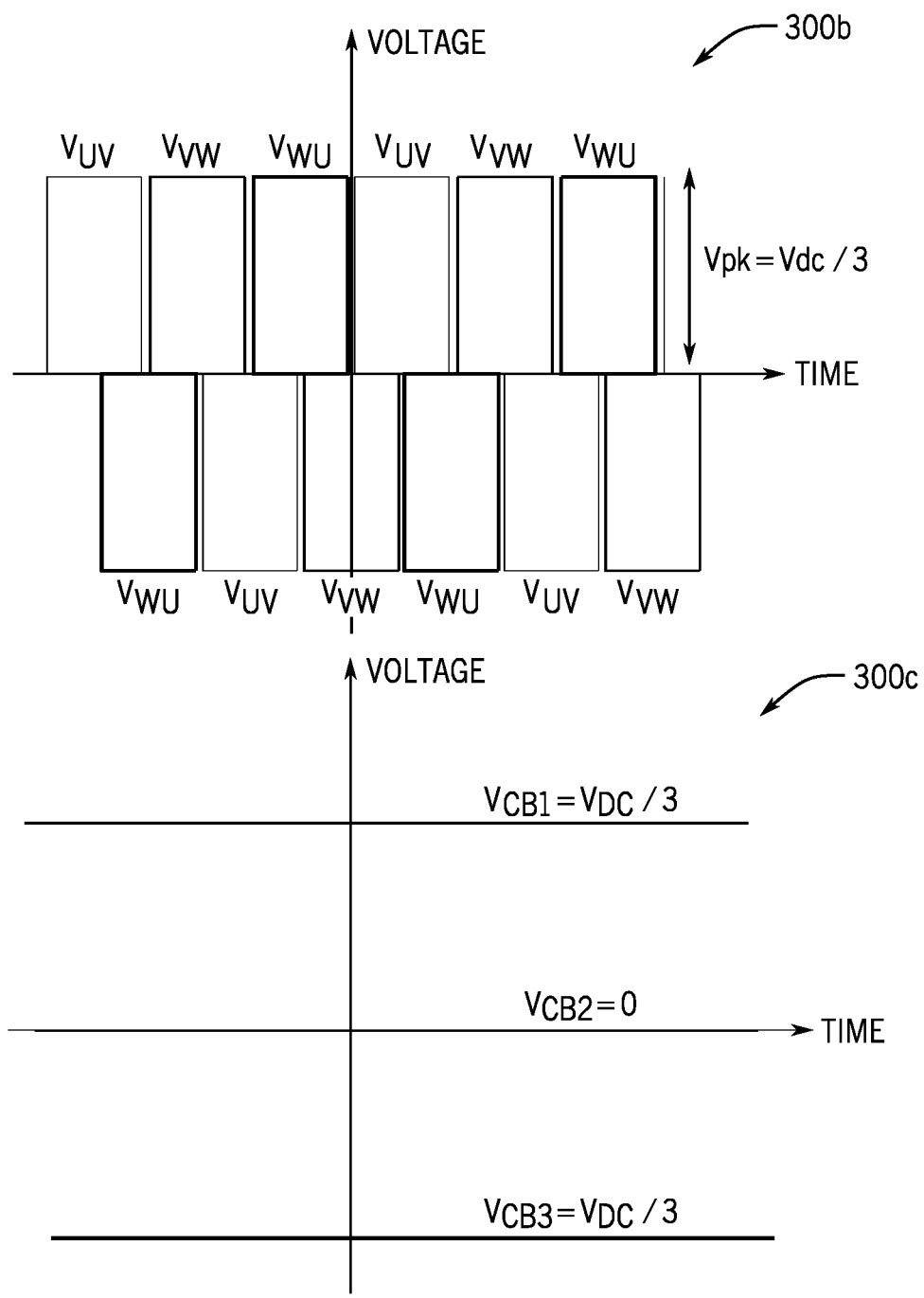
FIG. 3B illustrates various voltages for a three-phase cascaded bridge as described above.

FIG. 3A illustrates drive patterns and various voltages for a three-phase cascaded bridge as described above. FIG. 3B includes a simplified schematic 300a of a three-phase cascaded bridge in which an input voltage $V_{DC}$ is applied across a cascade of three half bridges. The respective input capacitors $C_{D1}$, $C_{D2}$, $C_{D3}$, impress the voltages depicted in plot 300c across the respective half bridges. In other words, capacitor $C_{B1}$ imposes a voltage $V_{CB1}$ having an average value equal to $V_{DC}/3$ on the upper half bridge. Capacitor $C_{B2}$ imposes a voltage $V_{CB2}$ having an average value equal to zero across the middle half bridge. Capacitor $C_{B3}$ impresses a voltage having an average value $V_{CB3}$ equal to $-V_{DC}/3$ across the lower half bridge. The respective half bridges have their switch nodes (unlabeled in FIG. 3) coupled to respective output terminals U, V, W via respective DC blocking capacitors $C_{B1}$, $C_{B2}$, $C_{B3}$. The switching of the respective devices may be operated in the phase staggered manner depicted in plot 300b to produce the illustrated respective three-phase output voltages $V_{UV}$, $V_{VW}$, $V_{WU}$.

Figure 4A:
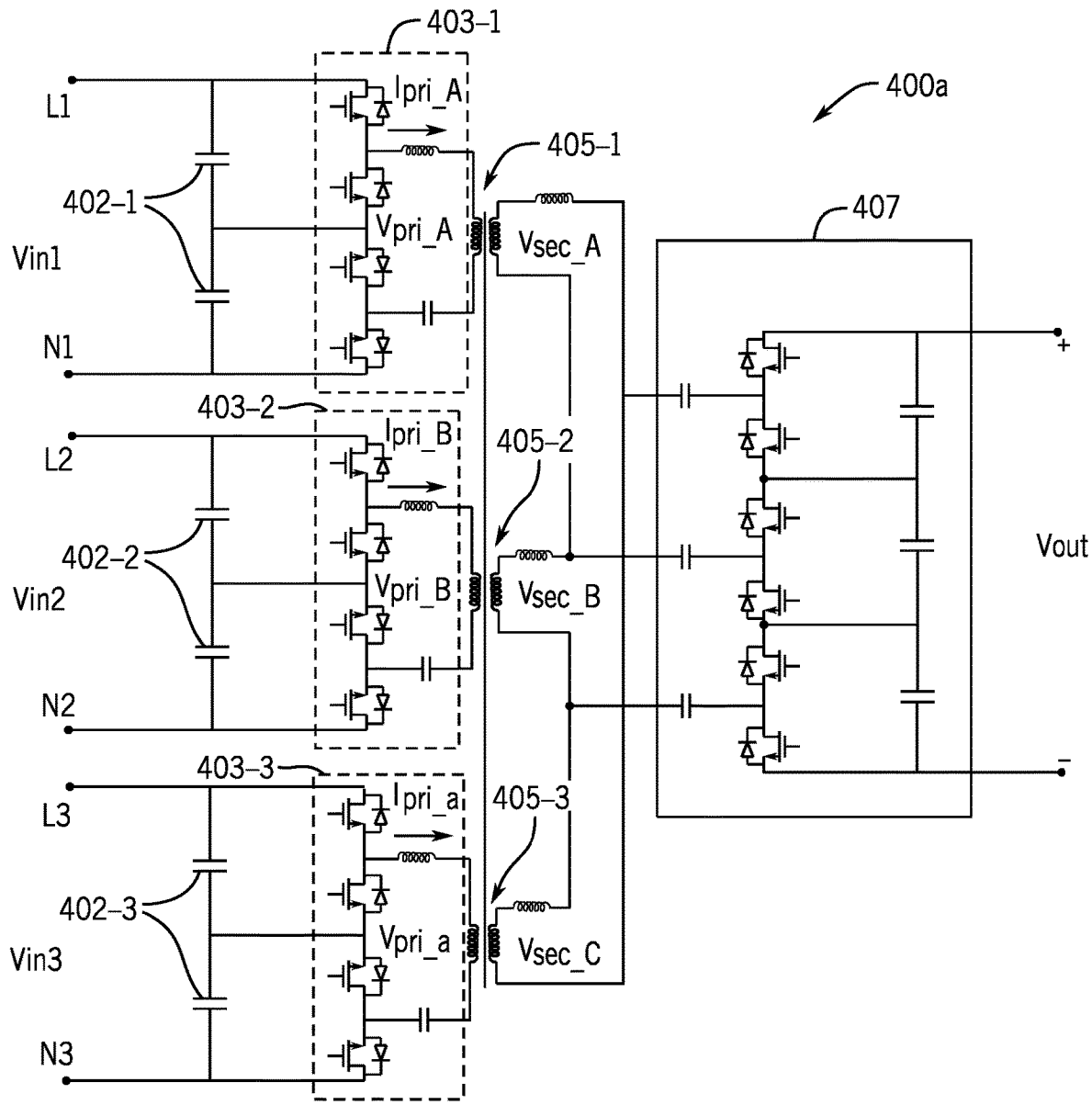
FIG. 4A illustrates a three-phase AC-DC converter with a three-phase cascaded bridge rectifier on the secondary.

FIG. 4A schematically depicts a three-phase AC-DC converter 400a with a three-phase cascaded bridge rectifier 407 on the secondary. On the AC input side, three AC input voltages Vin1, Vin2, Vin3 can be provided to the inputs of stacked half bridge converters 403-1, 403-2, 403-3 by respective pairs of stacked input capacitors 402-1, 402-2, 402-3. Each stacked half bridge converter can include an upper and lower half bridge, with each half bridge having upper and lower switches as described above. Alternatively, a cascade of three or more half bridges could be provided for each input phase. The input voltage can be in an open configuration, as illustrated in FIG. 4A, such that the three input voltages can be independent. Alternatively, the inputs could be connected in either a wye or delta configuration if desired. The switch nodes of the half bridges of each phase can be connected to the primary windings of transformers 405-1, 405-2, 405-3, which can be separate single-phase transformers or a three-phase transformer. The connection between the stacked or cascaded bridges and the transformer primary windings can include DC blocking capacitors (as described above) and there may also be a discrete or parasitic/leakage inductance as depicted, but unlabeled in FIG. 4A, but described in greater detail above.

On the secondary side, the secondary winding of each transformer 405-1, 405-2, 405-3 can be coupled to rectifying bridge 407, which can be a three-phase cascaded half bridge converter. As in other embodiments, the coupling can be via DC blocking capacitors between the respective transformer winding terminals and corresponding switch nodes of the half bridges. The transformer secondary windings can be connected in either a delta configuration (as illustrated) or a wye configuration, as desired for a particular embodiment. The switches of the rectifying bridge can be operated to convert the AC voltage appearing at the transformer secondary windings into an output voltage Vout, with the output bus being supported by stacked DC output filter capacitors.

Figure 4B:
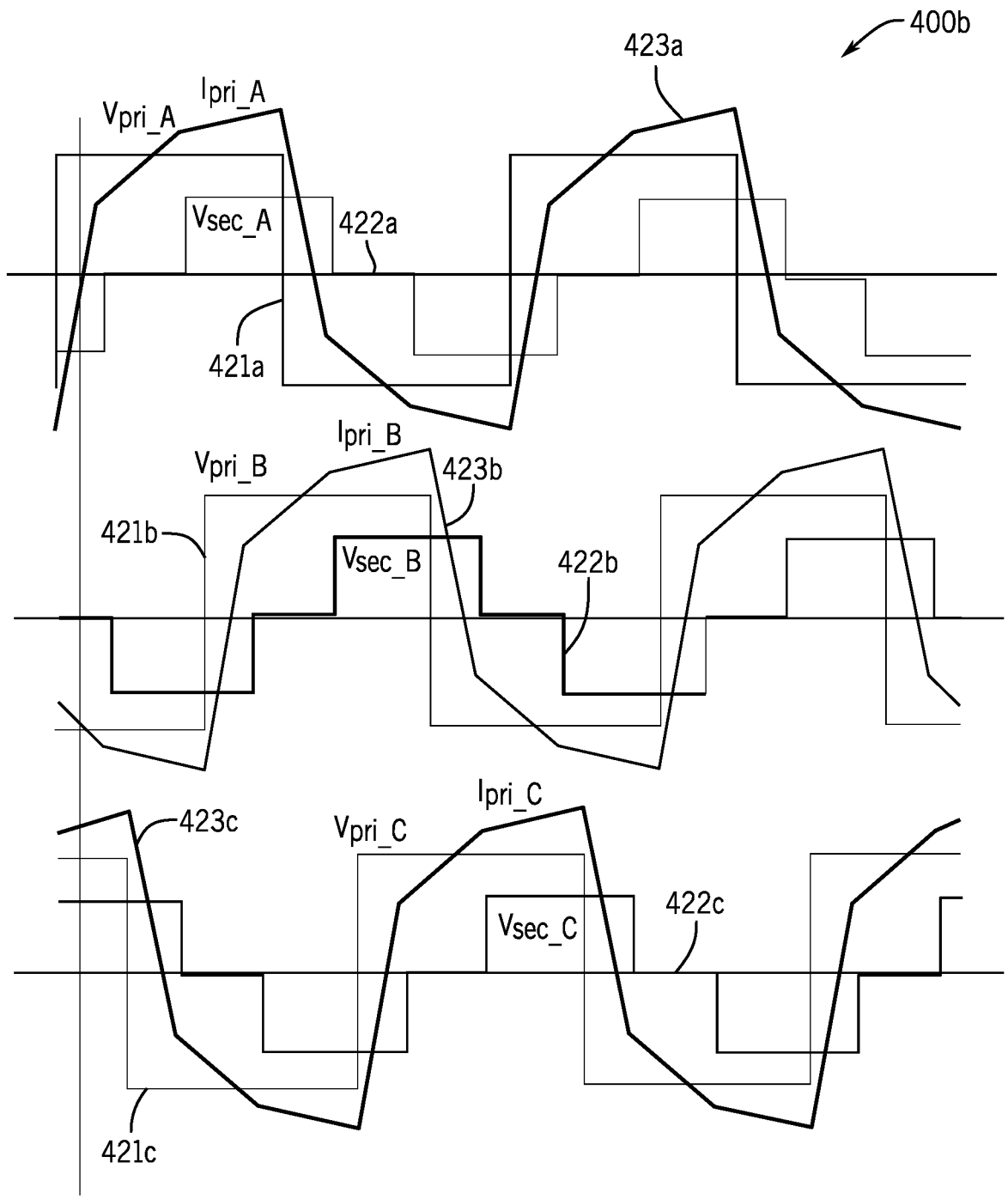
FIG. 4B illustrates various waveforms of the three-phase AC-DC converter with a three-phase cascaded bridge rectifier on the secondary.

FIG. 4A also depicts the location of various voltage and current waveforms that are illustrated in FIG. 4B. More specifically, the transformer primary winding voltages Vpri_A (421a), Vpri_B (421b), and Vpri_C (421c) along with the transformer primary winding currents Ipri_A (423a), Ipri_B (423b), and Ipri_C (423c) are depicted. Likewise, the secondary winding voltages Vsec_A (422a), Vsec_B (422b), and Vsec_C (422c) are also depicted. As can be seen in the FIG. 4B depiction of these waveforms, the switching devices can be operated in a phase staggered manner with 120 degrees between phases at the fundamental line frequency (i.e., the frequency of the AC input voltages) or at the switching frequency of the respective half bridges. The various switching devices may be operated to produce the illustrated voltages and currents using suitable modulation techniques and control circuitry, such as control circuitry as was described above with respect to FIG. 2A.

Figure 5A:
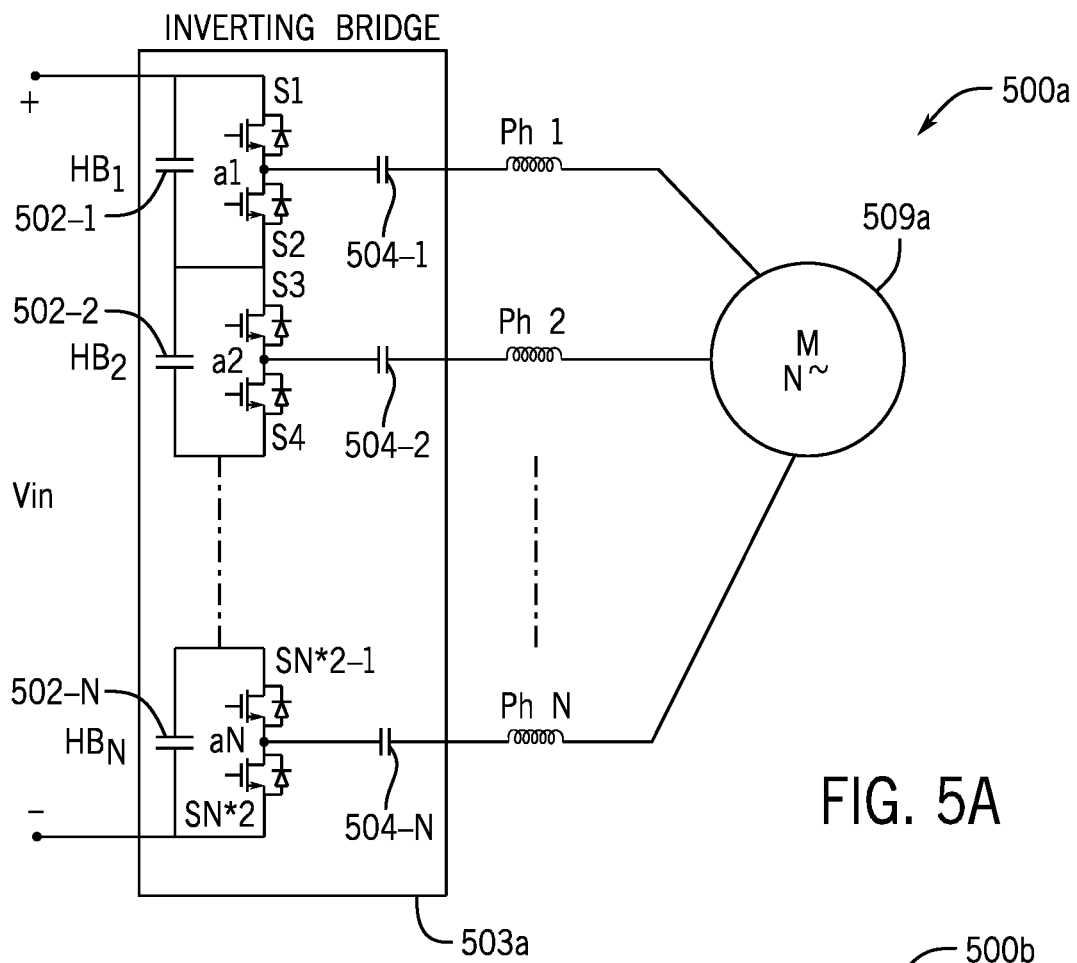
FIG. 5A illustrates a multi-phase cascaded bridge motor drive having N phases.

FIG. 5A schematically depicts a multi-phase cascaded bridge motor drive 500a having N phases HB1, HB2, . . . , HBN. The motor drive receives an input voltage Vin across the cascade of half bridges making up inverting bridge 503a. Each half bridge can include an input capacitor 502-1, 502-2, . . . , 502-N and a pair of switches S1/S2, S3/S4, . . . , SN*2–1, SN*2, with the switches of each half bridge being coupled at a corresponding switch node a1, a2, . . . , aN. Each half bridge switch node a1, a2, . . . , aN can be coupled to a phase winding Ph1, Ph2, . . . , PhN of the motor 509a via respective DC blocking capacitors 504-1, 504-2, . . . , 504-N. Motor 509a can be would with a number of phases selected to correspond to the number of phases of the inverting bridge 503a or vice-versa. As described with respect to the embodiments discussed above, the switching devices of the respective half bridges can be operated in a phase staggered manner to produce a multi-phase AC voltage that is delivered to motor 509a. Switching signals for the respective switches can be generated by control circuitry, such as the control circuitry described above with respect to FIG. 2A. However, the control logic, algorithms, and loops for a motor drive will differ in some respects from the control circuitry used for the various converters described above.

Figure 5B:
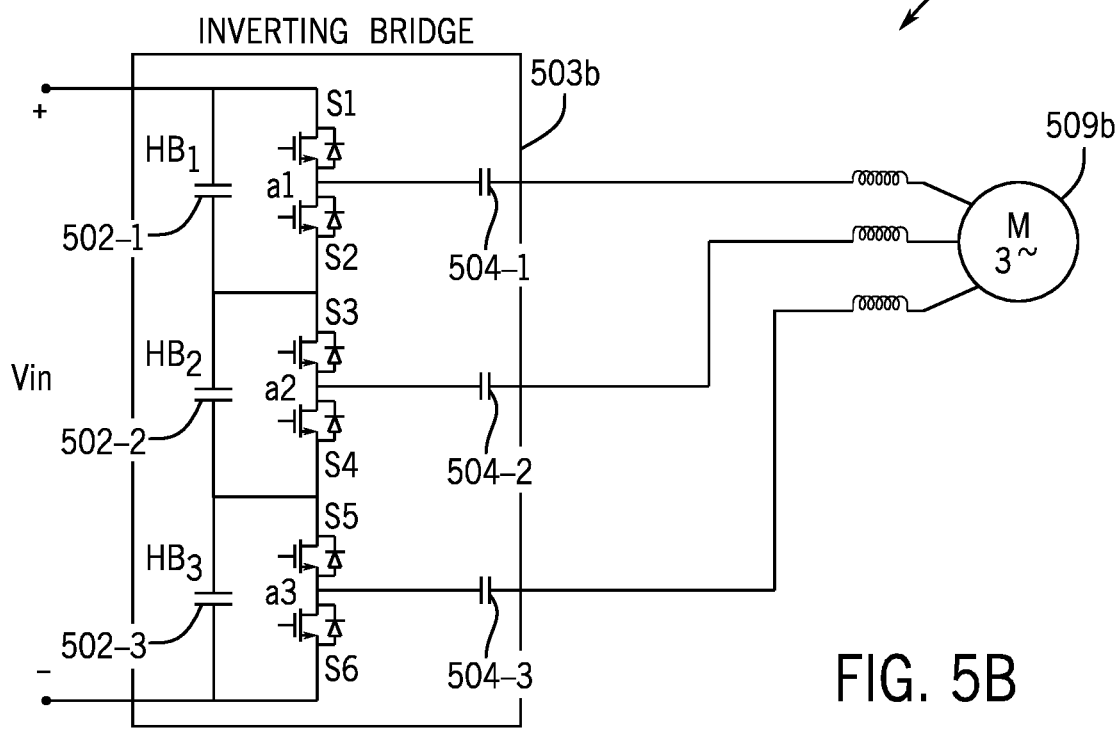
FIG. 5B illustrates a multi-phase cascaded bridge motor drive having three phases.
Figure 5C:
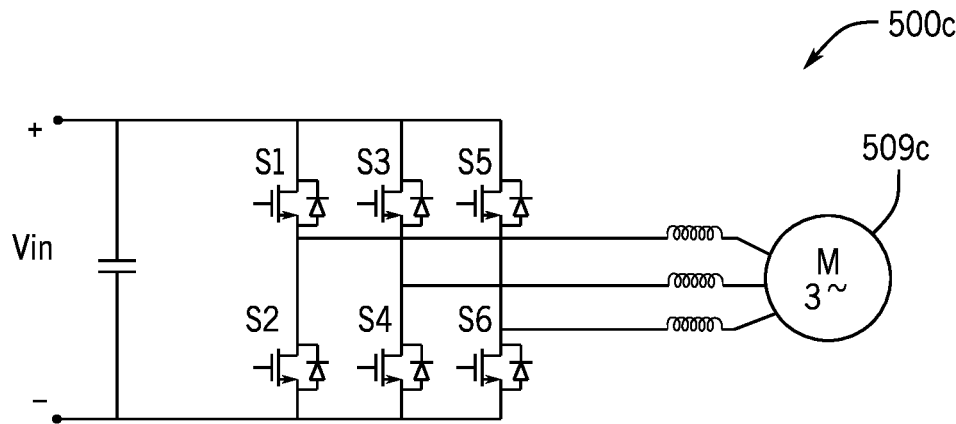
FIG. 5C illustrates a three-phase half bridge motor drive.
Figure 5D:
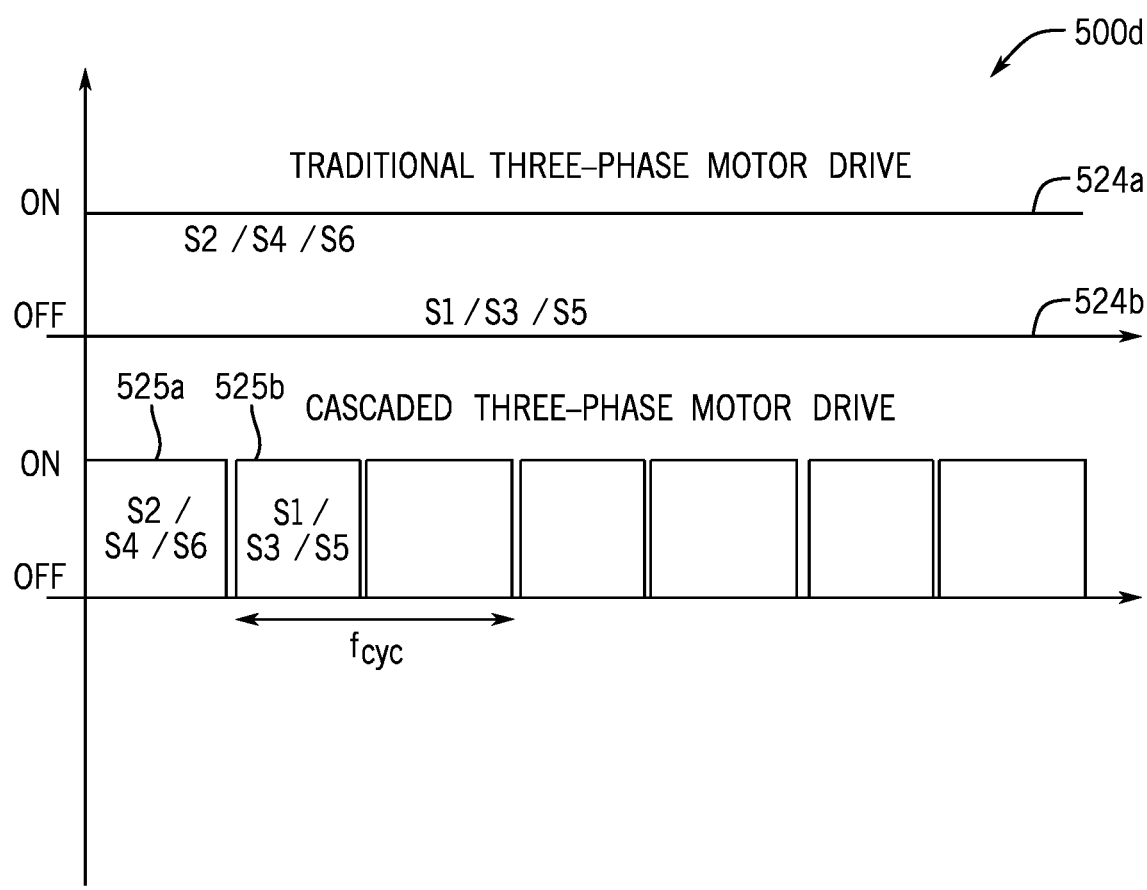
FIG. 5D illustrates certain drive patterns for a traditional three phase motor drive and a cascaded three-phase motor drive when shorting the three phase motor.

FIG. 5B schematically depicts a multi-phase cascaded bridge motor drive 500b having three phases HB1, HB2, HB3 making up inverting bridge 503b, which can be as described above with respect to FIG. 5A. FIG. 5C illustrates a three-phase half bridge motor drive 500c for comparison purposes. Motor drive 600c receives an input voltage Vin which is converted to a three-phase AC voltage by operation of three half bridges S1/S2, S3/S4, S5/S6 connected in parallel to the input voltage (and an optional input capacitor). The switch nodes of the respective half bridges are each coupled to a respective phase winding of motor 509c. FIG. 5D illustrates a plot 500d of certain drive patterns for a traditional three phase motor drive and a cascaded three-phase motor drive. More specifically, one switching configuration that may be used in motor drive applications is short circuiting the stator windings of the motor. As illustrated in the upper portion of plot 500d, this can be achieved in a traditional motor drive (as illustrated in FIG. 5C) by turning on lower switches S2, S4, S6 (as illustrated by curve 524a), and turning off upper switches S1, S3, S5 (as illustrated by curve 524b). However, in a cascaded half-bridge configuration, such as that illustrated in FIG. 5B, balancing the input capacitor voltages can require alternating between a first zero voltage state in which lower switches S2, S4, S6 are turned on with upper switches S1, S3, S5 turned off (as illustrated by curve 525a) and a state in which upper switches S1, S2, S3 are turned on with lower switches S2, S4, S6 turned off (as illustrated by curve 525b). The alternation between these states can occur at a frequency $f_{eye}$ that is dependent on input capacitance and amplitude of the motor current, with a higher frequency corresponding to larger relative energy handling.

To summarize, a cascaded half bridge motor drive can use the same bridge topology as the cascaded half bridge converters described above, albeit controlled differently. Motor drive control can be similar to a traditional two-level, three-leg topology as depicted in FIG. 1B. Because each of the stacked capacitors can be balanced, the effective DC bus voltage for controls is $1/N^{th}$ of the total bus voltage in the proposed cascaded bridge topology. For three-phase motor drive applications, the control and subsequent drive characteristics can be very similar in that each half-bridge is controlled similarly to each leg of the traditional two-level three-phase, three-leg topology. Zero voltage states can be applied by turning on either all the top or all the bottom switch of each half bridge, again similar to a traditional two-level topology. One slight difference can arise in that when shorting the motor stators, which may be done for an indefinite amount of time in some applications, balancing the stacked capacitor voltages may involve alternately turning on both of the zero voltage states.

Figure 6A:
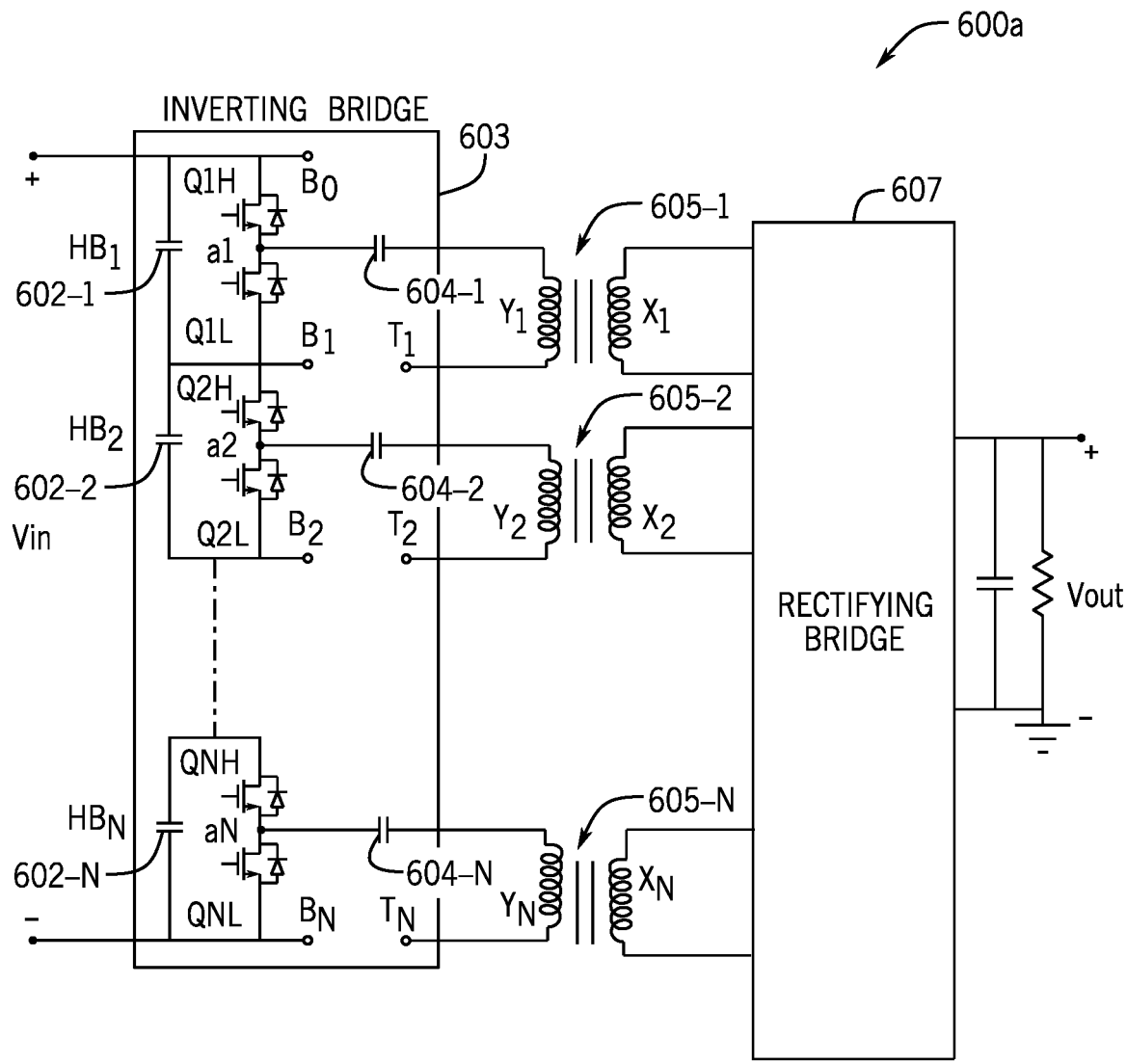
FIG. 6A illustrates a generalized multi-phase bridge with configurable return windings.

FIG. 6A illustrates a generalized multi-phase bridge 600a with configurable return windings. As in the embodiments described above, an input voltage Vin can be applied across a cascade of half bridges $HB_1$, $HB_2$, . . . , $HB_N$ forming inverting bridge 603. Each half bridge can include an input capacitor 602-1, 602-2, . . . , 602-N. Each half bridge can also include an upper switch Q1H, Q2H, . . . , QNH and a lower switch Q1L, Q2L, . . . , QNL, with the upper and lower switches being connected at a switch node a1, a2, . . . , aN. The switch nodes can be connected to first terminals of transformer primary windings $Y_1$, $Y_2$, . . . , $Y_N$ by DC blocking capacitors 604-1, 604-2, . . . , 604-N. Transformers 605-1, 605-2, . . . , 605-N may each include primary windings $Y_1$, $Y_2$, . . . , $Y_N$ and secondary windings $X_1$, $X_2$, . . . , $X_N$. The secondary windings may be coupled to rectifying bridge 607, which may be of various configurations, such as those described above with respect to FIGS. 2A-2E. In the illustrated example, each secondary winding is shown as being separately coupled to rectifying bridge 607, i.e., in an open configuration, although wye or delta configurations could also be used. In any case, the switching devices of rectifying bridge may be operated to convert AC voltage(s) appearing across the secondary windings to a DC output voltage Vout, which can be delivered to a load (represented by the unlabeled resistor in FIG. 6A) with the output voltage bus being supported by an output filter capacitor (also unlabeled in FIG. 6A).

Turning back to inverting bridge 603, a plurality of bridge attachment points $B_0$, $B_1$, $B_2$, . . . , $B_N$ can be connected to second terminals $T_1$, $T_2$, . . . , $T_N$ of the transformers in various configurations, such as wye, delta, or open configurations, as desired for a particular example. For example, the multi-phase via N single phase configuration illustrated in FIG. 6B with corresponding waveforms illustrated in FIG. 6C, or the multi-phase via N split-phase transformers illustrated in FIG. 6D with corresponding waveforms illustrated in FIG. 6E. Switching drive signals can be generated by control circuitry, which can be as described above with respect to FIG. 2A.

Figure 6B:
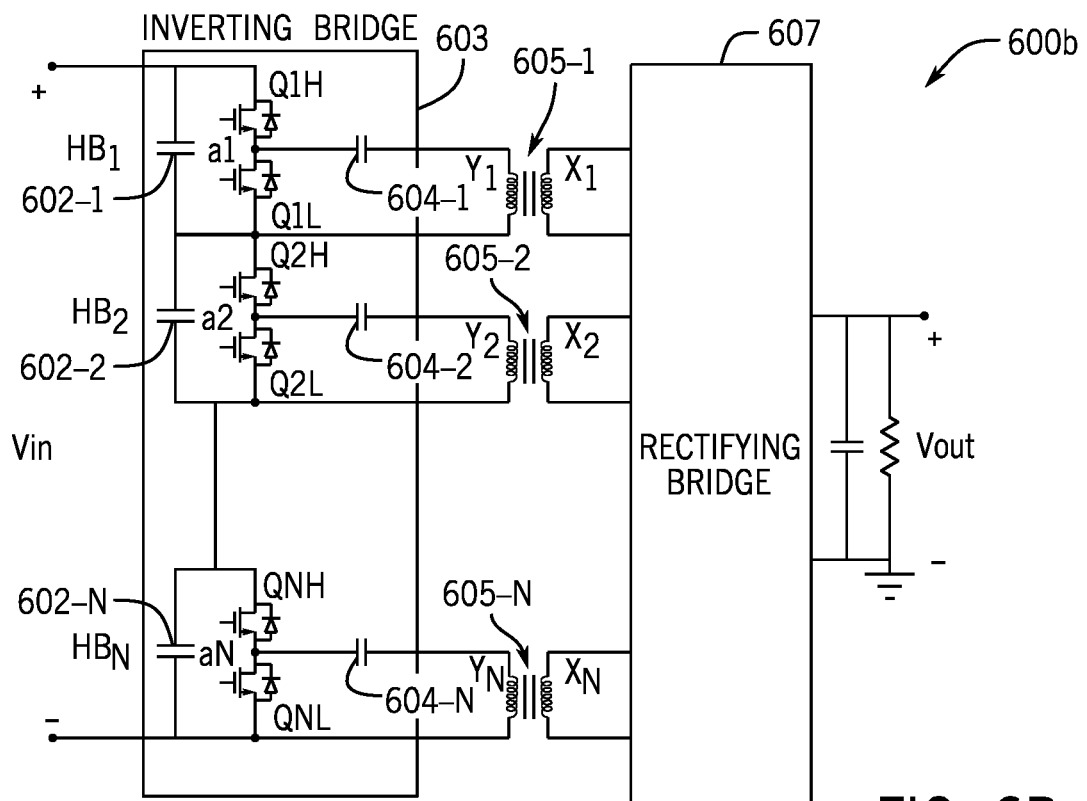
FIGS. 6B-6C respectively illustrate a multi-phase cascaded bridge converter with multiple single-phase transformers and associated waveforms.
Figure 6C:
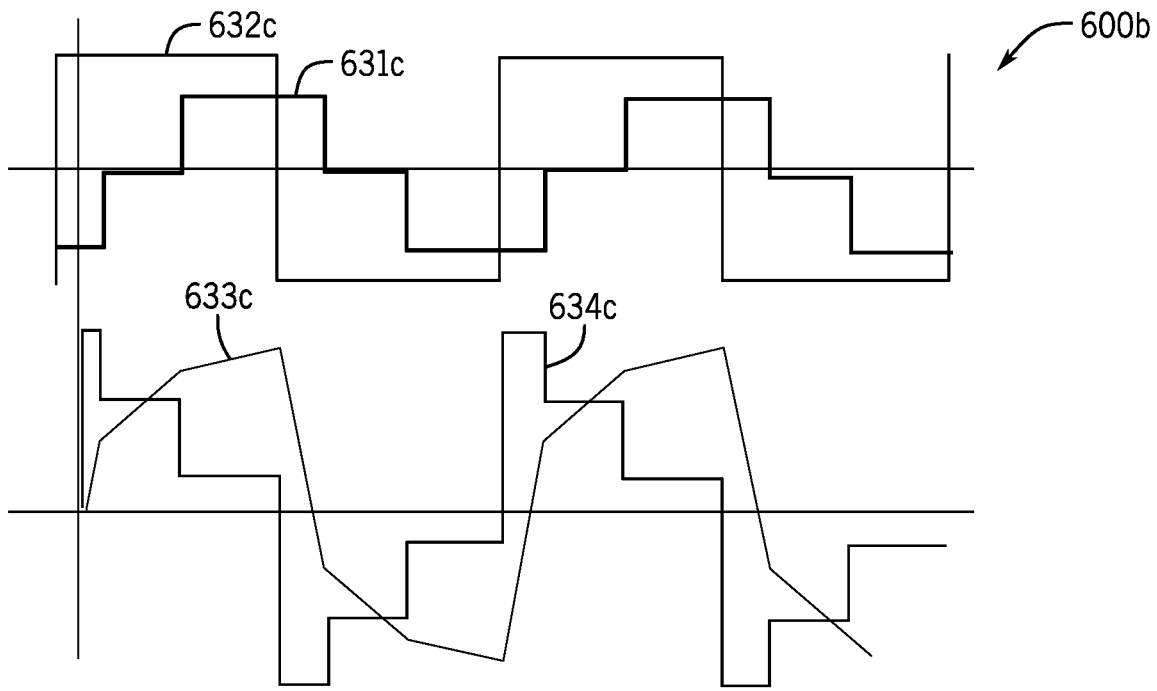

FIGS. 6B-6C respectively illustrate a multi-phase cascaded bridge converter 600b with multiple single-phase transformers 605-1, 605-2, . . . , 605-N and associated waveforms 600c. Multi-phase cascaded bridge converter 600b can be constructed as described above with reference to FIG. 6A, and bridge attachment points $B_1$, $B_2$, . . . , $B_N$ (FIG. 6A) connected as shown so that each half bridge $HB_1$, $HB_2$, . . . , $HB_N$ drives a respective primary winding $Y_1$, $Y_2$, . . . , $Y_N$ of a respective single-phase transformer 605-1, 605-2, . . . , 605-N. In this configuration bridge attachment point $B_0$ (FIG. 6A) is left unconnected. Otherwise, the construction and operation of the circuit can be as described above. FIG. 6C illustrates exemplary waveforms, which can be generated by controlled switching of the various switching devices. Voltage $VY_1$ can be the voltage across the first primary winding $Y_1$, represented by waveform 632c, with corresponding secondary voltage Vx1 (waveform 631c)

being the voltage appearing across the corresponding secondary winding $X_1$. The additional phases may be driven to produce similar waveforms in a phase staggered manner, as described above. Current waveform 633c represents the primary current $IY_1$, i.e., the current through primary winding Y1, while waveform 634c represents the difference between the primary and secondary voltages.

Figure 6D:
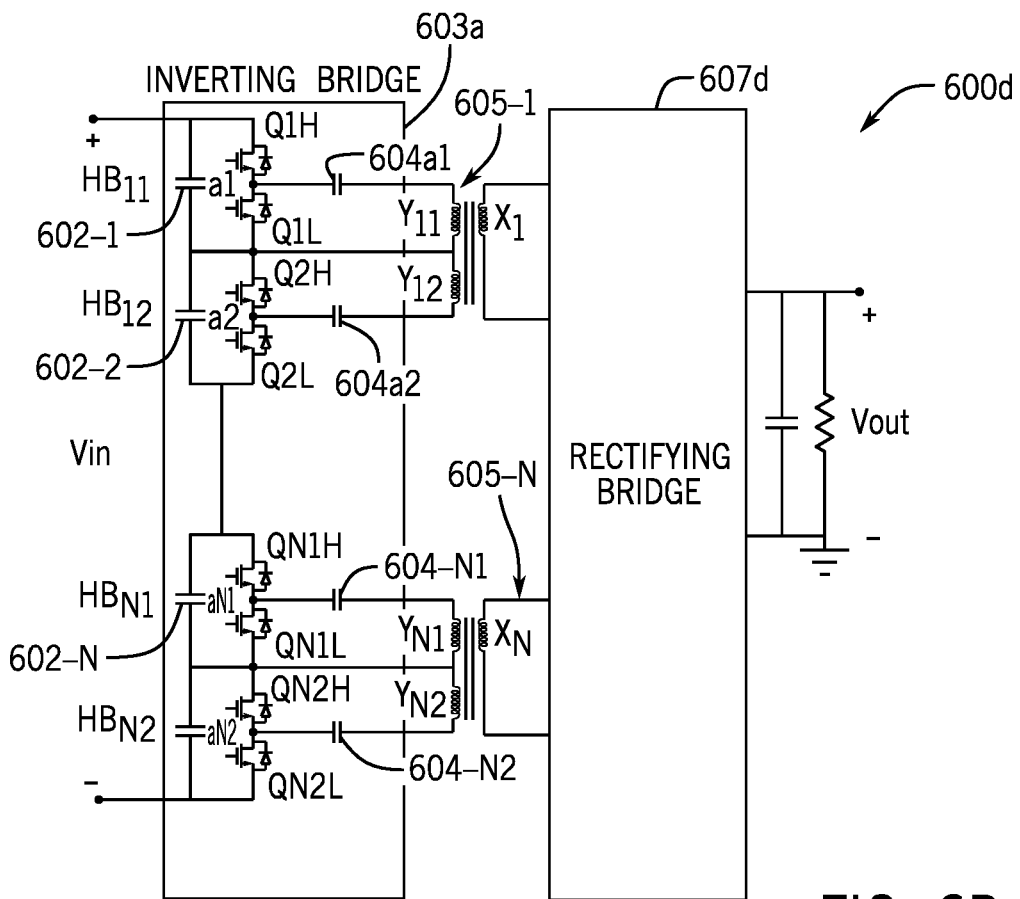
FIGS. 6D-6E respectively illustrate a multi-phase cascaded bridge converter with multiple split-phase transformers and associated waveforms.
Figure 6E:
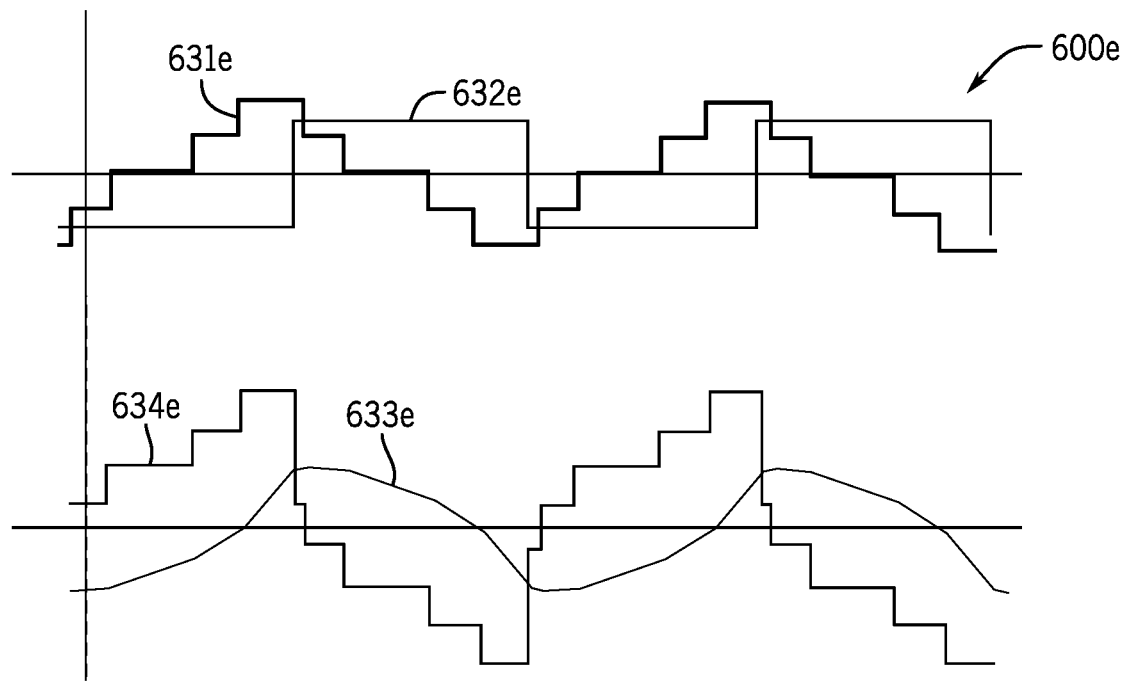

FIGS. 6D-6E respectively illustrate a multi-phase cascaded bridge converter 600D with multiple split-phase transformers 605-1 . . . 605-N and associated waveforms 600c. Multi-phase cascaded bridge converter 600d can be constructed as described above with reference to FIG. 6A, and bridge attachment points $B_1$, $B_2$, . . . , $B_N$ (FIG. 6A) connected as shown to so that each half bridge $HB_{11}$, $HB_{12}$, . . . , $HB_{N1}$, $HB_{N2}$ drives a respective split phase primary winding $Y_{11}$, $Y_{12}$, . . . , $Y_{1N}$, $Y_{2N}$ of a respective split-phase transformer 605-1, . . . , 605-N. In this configuration bridge attachment point $B_0$ (FIG. 6A) is left unconnected. Otherwise, the construction and operation of the circuit can be as described above. FIG. 6E illustrates exemplary waveforms, which can be generated by controlled switching of the various switching devices. Voltage $VY_1$ can be the voltage across the first primary winding Y1, represented by waveform 632e, with corresponding secondary voltage $V_{X1}$ (waveform 631e) being the voltage appearing across the corresponding secondary winding $X_1$. The additional phases may be driven to produce similar waveforms in a phase staggered manner, as described above. Current waveform 633e represents the secondary current $IX_1$, i.e., the current through secondary winding $X_1$, while waveform 634e represents the difference between the primary and secondary voltages.

Figure 7A:
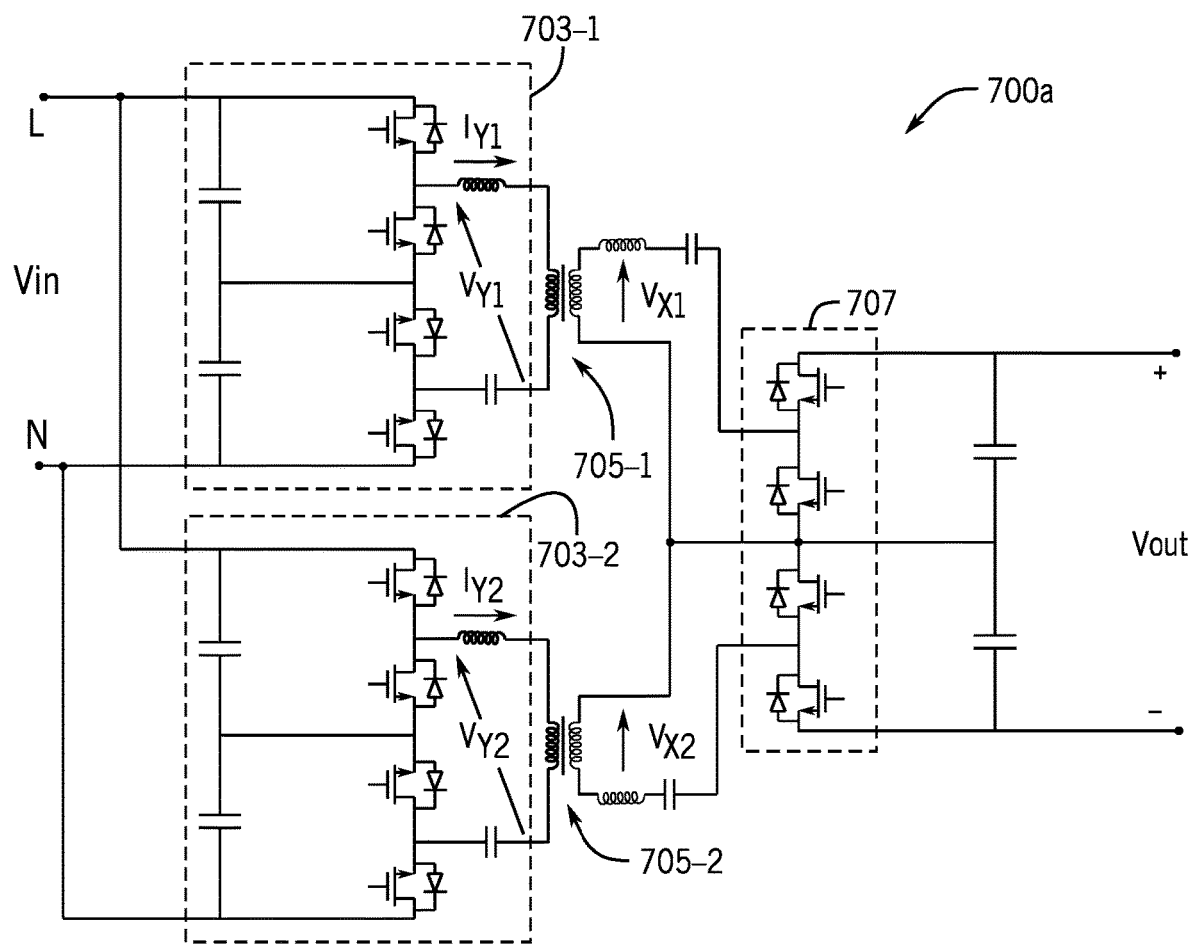
FIG. 7A illustrates a single-phase AC-DC converter with paralleled stacked half bridges on the primary and a split phase stacked half bridge secondary.
Figure 7B:
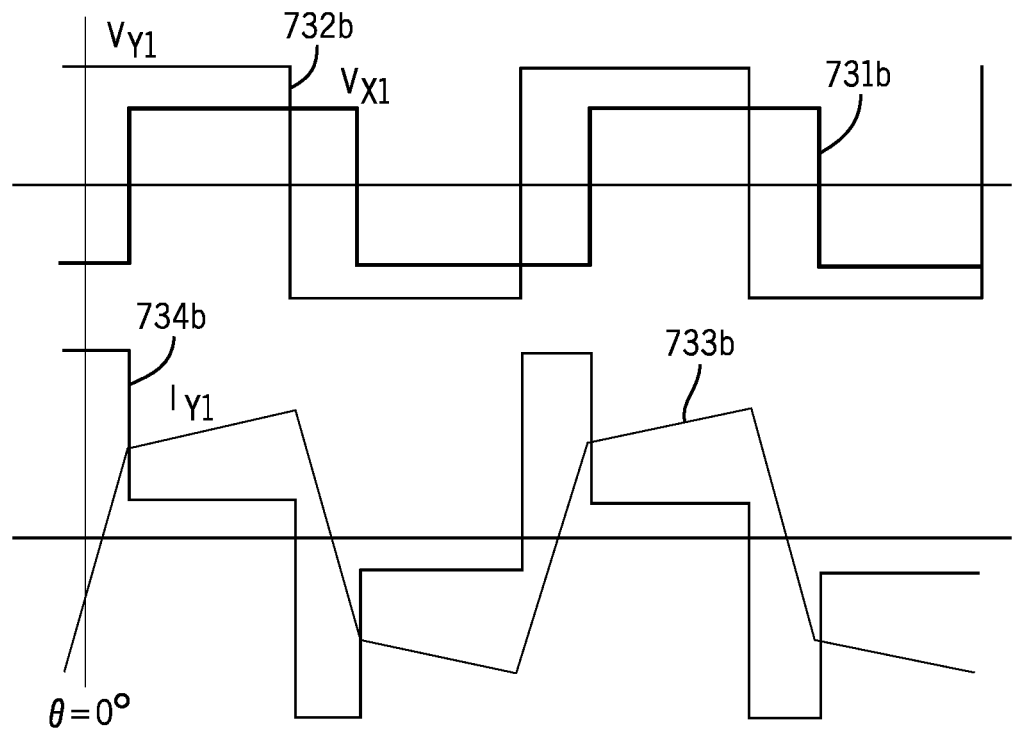
FIGS. 7B-7C illustrates various waveforms of the single-phase AC-DC converter with paralleled stacked half bridges on the primary and a split phase stacked half bridge secondary.
Figure 7C:
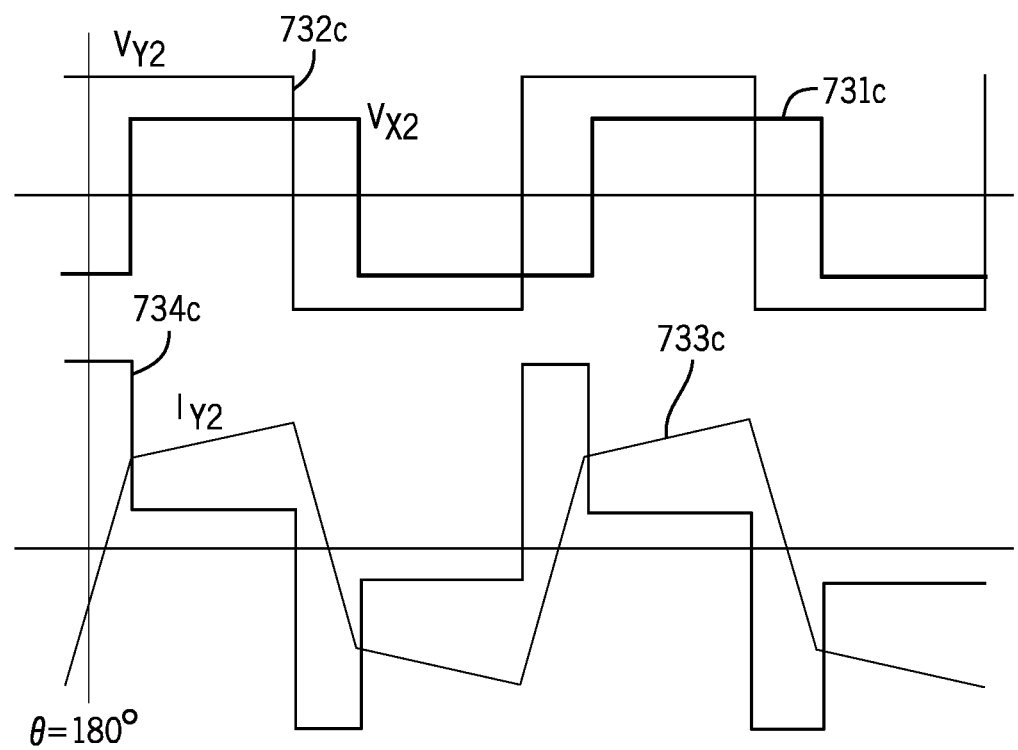

FIG. 7A illustrates a single-phase AC-DC converter 700a with paralleled stacked half bridges 703-1 and 703-2 connected to the primary windings of transformer 705-1, 705-2 and a split phase stacked half bridge converter 707 connected to the secondary windings. Stacked half bridges 703-1 and 703-2 can be connected in parallel across the AC input voltage Vin and can otherwise be constructed as described above. The switch nodes of the upper and lower half bridges in each stack can be connected to respective primary windings of the transformers. Primary winding voltages $VY_1$, $VY_2$ and primary winding currents as shown in FIG. 7A are plotted in FIGS. 7B-7C described in greater detail below. The secondary windings of transformers can be connected in a split-phase configuration, with voltages $VX_1$ and $VX_2$ being as illustrated in FIGS. 7B-7C. The common terminals of the transformer secondaries can be coupled to the junction point of the respective half bridges of rectifying bridge 707, with the other terminals of the respective transformers being coupled to the switch nodes of the respective half bridges. The switches of the stacked half bridges of rectifying bridge 707 can be operated by control circuitry similar to that described above to produce a DC output voltage Vout that can be delivered to a load.

The switching waveforms for single-phase AC-DC converter 700a can be 360/N or 180 degrees phase shifted across each transformer. Each front-end stage can process an equal amount of power to maintain balance of the secondary side capacitor stack. FIGS. 7B-7C illustrate various waveforms of the single-phase AC-DC converter with paralleled stacked half bridges on the primary and a split phase stacked half bridge secondary. FIG. 7B illustrates the waveforms during the first phase, including primary winding voltage $VY_1$ (732b) and corresponding secondary winding voltage $VX_1$ (731b), primary winding current $IY_1$ (733b) and the difference between primary and secondary voltage 734b. (Locations of these voltages and currents are depicted in FIG. 7A.) FIG. 7C illustrates the waveforms corresponding to the second phase, i.e., 180 degrees out of phase, including primary winding voltage $VY_2$ (732c) and corresponding secondary winding voltage $VX_2$ (731c), primary winding current $IY_2$ (733c) and the difference between primary and secondary voltage 734c. (Locations of these voltages and currents are depicted in FIG. 7A.)

The foregoing describes exemplary embodiments of cascaded half bridge converters for various DC/DC, AC/DC, and DC/AC conversion applications. Such configurations may be used in a variety of applications but may be particularly advantageous when used in conjunction with battery chargers, motor drive systems, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An isolated switching converter comprising an inverting bridge, a transformer, a rectifying bridge, and control circuitry, wherein:
    the inverting bridge has an input that receives an input voltage and an output that delivers a voltage to a plurality of primary windings of the transformer, the inverting bridge comprising a plurality of half bridges cascaded across the input voltage, each half bridge comprising:
        an input capacitor;
        upper and lower switches coupled across the input capacitor and connected at a switch node; and
        a DC blocking capacitor coupled between the switch node and a primary winding terminal of the transformer; and
    the rectifying bridge has an input coupled to a plurality of secondary windings of the transformer and an output that delivers a voltage to an output of the isolated switching converter, the rectifying bridge comprising one or more rectifier switches; and
    the control circuitry monitors one or more inverter feedback signals and generates in response thereto inverter drive signals that operate the upper and lower switches of the plurality of half bridges in a phase staggered manner and monitors one or more rectifier feedback signals and generates in response thereto rectifier drive signals that operate one or more switches of the rectifying bridge.

2. The isolated switching converter of claim 1 wherein the input voltage is a DC voltage.

3. The isolated switching converter of claim 1 wherein the plurality of half bridges comprises three half bridges.

4. The isolated switching converter of claim 1 wherein the primary windings or the secondary windings of the transformer are connected in a delta or wye configuration.

5. The isolated switching converter of claim 1 wherein the primary windings or the secondary windings of the transformer are connected in an open configuration.

6. The isolated switching converter of claim 1 wherein the rectifying bridge is a multi-phase half-bridge rectifying bridge or a current multiplying rectifying bridge.

7. The isolated switching converter of claim 1 wherein the rectifying bridge is a multiphase cascaded bridge comprising a plurality of half bridges cascaded across the output voltage, each half bridge comprising:
- a DC blocking capacitor coupled between a secondary winding terminal of the transformer and a switch node of the half bridge; and
- upper and lower switches connected at the switch node and coupled across an output capacitor.

8. The isolated switching converter of claim 7 wherein the inverting bridge comprises a plurality of inverting bridges connected to respective AC input voltages.

9. The isolated switching converter of claim 8 wherein the primary windings are connected in an open configuration, and the secondary windings are connected in a delta configuration.

10. The isolated switching converter of claim 7 wherein the inverting bridge comprises first and second half bridges connected in a split phase configuration to the secondary winding terminals.

11. The isolated switching converter of claim 10 wherein the rectifying bridge is a split phase cascaded bridge.

12. A motor drive comprising an inverting bridge and control circuitry, wherein the inverting bridge has an input that receives an input voltage and an output that delivers a multi-phase voltage to a plurality of motor windings; wherein:
- the inverting bridge comprises a plurality of half bridges cascaded across the input voltage, each half bridge comprising:
  - an input capacitor;
  - upper and lower switches coupled across the input capacitor and connected at a switch node; and
  - a DC blocking capacitor coupled between the switch node and a primary winding terminal of a transformer; and
- the control circuitry monitors one or more inverter feedback signals and generates in response thereto inverter drive signals that operate the upper and lower switches of the plurality of half bridges in a phase staggered manner.

13. The motor drive of claim 12 wherein the plurality of half bridges comprises three half bridges.

14. The motor drive of claim 12 wherein the control circuitry short circuits the plurality of motor windings by alternately applying first and second switching configurations that short circuit the motor windings and maintain a voltage balance of the input capacitors.

15. An isolated switching converter comprising an inverting bridge, one or more transformers, a rectifying bridge, and control circuitry, wherein:
- the inverting bridge has an input that receives an input voltage and an output including a plurality of bridge attachment points and a plurality of switch nodes that can be selectively connected to a plurality of transformer primary windings, the inverting bridge further having a plurality of half bridges cascaded across the input voltage, each half bridge comprising:
  - an input capacitor coupled between two of the plurality of bridge attachment points corresponding to the half bridge;
  - upper and lower switches coupled across the input capacitor and connected at a switch node of the plurality of switch nodes corresponding to the half bridge; and
  - a DC blocking capacitor coupled between the switch node corresponding to the half bridge and a primary winding terminal of the one or more transformers; and
- the rectifying bridge has an input coupled to one or more secondary windings of the one or more transformers and an output that delivers an output voltage to an output of the isolated switching converter, the rectifying bridge comprising one or more rectifier switches; and
- the control circuitry monitors one or more inverter feedback signals and generates in response thereto inverter drive signals that operate the upper and lower switches of the plurality of half bridges in a phase staggered manner and monitors one or more rectifier feedback signals and generates in response thereto rectifier drive signals that operate one or more switches of the rectifying bridge.

16. The isolated switching converter of claim 15 wherein the one or more transformers comprise a plurality of single-phase transformers.

17. The isolated switching converter of claim 15 wherein the one or more transformers comprise a multi-phase transformer.

18. The isolated switching converter of claim 15 wherein the one or more transformers comprise a split-phase transformer.

19. The isolated switching converter of claim 15 wherein the rectifying bridge is a multi-phase half-bridge rectifying bridge or a current multiplying rectifying bridge.

20. The isolated switching converter of claim 15 wherein the rectifying bridge is a multiphase cascaded bridge comprising a plurality of half bridges cascaded across the output voltage, each half bridge comprising:
- a DC blocking capacitor coupled between a secondary winding terminal of the transformer and a switch node of the half bridge; and
- upper and lower switches connected at the switch node and coupled across an output capacitor.

\* \* \* \* \*